US006816983B2

(12) United States Patent
Kurafuji

(10) Patent No.: US 6,816,983 B2
(45) Date of Patent: Nov. 9, 2004

(54) MICROPROCESSOR INTERNALLY PROVIDED WITH TEST CIRCUIT

(75) Inventor: Takashi Kurafuji, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 564 days.

(21) Appl. No.: 09/785,466

(22) Filed: Feb. 20, 2001

(65) Prior Publication Data

US 2001/0049803 A1 Dec. 6, 2001

(30) Foreign Application Priority Data

May 30, 2000 (JP) ........................................ 2000-159678

(51) Int. Cl.⁷ .......................... G06F 11/00; G01R 31/28
(52) U.S. Cl. .......................... 714/30; 714/724; 714/733
(58) Field of Search ............................. 714/30, 34, 35, 714/724, 733

(56) References Cited

U.S. PATENT DOCUMENTS

| 5,737,516 A | * | 4/1998 | Circello et al. ............... 714/38 |
| 5,960,210 A | * | 9/1999 | Jin ................................. 712/1 |
| 6,282,657 B1 | * | 8/2001 | Kaplan et al. .............. 713/201 |
| 6,339,555 B1 | * | 1/2002 | Hamada et al. ............. 365/201 |
| 6,367,032 B1 | * | 4/2002 | Kasahara ..................... 714/25 |
| 6,467,056 B1 | * | 10/2002 | Satou et al. ................. 714/720 |
| 6,530,047 B1 | * | 3/2003 | Edwards et al. ............ 714/724 |

FOREIGN PATENT DOCUMENTS

JP          05-128281          5/1993

OTHER PUBLICATIONS

"Computer Organization and Design the Hardware/Software Interface", John L. Hennessy and David A. Patterson, Morgan Kaufmann Publishers, Inc. 1994, pp. 396–423.

* cited by examiner

Primary Examiner—Robert Beausoliel
Assistant Examiner—Emerson Puente
(74) Attorney, Agent, or Firm—McDermott Will & Emery LLP

(57) ABSTRACT

A microprocessor includes: a memory storing a program and various data; a processor core executing the program stored in the memory; an external bus interface serving as an interface portion of an external bus connected to an external device; a test circuit receiving a program counter value of an instruction to be executed by the processor core for outputting a test event signal for testing the microprocessor in synchronization with an operation timing of the processor core; a test event signal output terminal for outputting the test event signal to an external portion of the microprocessor, and an external event request signal input terminal provided for applying the processor core an external event request signal used by the external device to notify an event request with respect to the processor core.

20 Claims, 24 Drawing Sheets

FIG. 3A
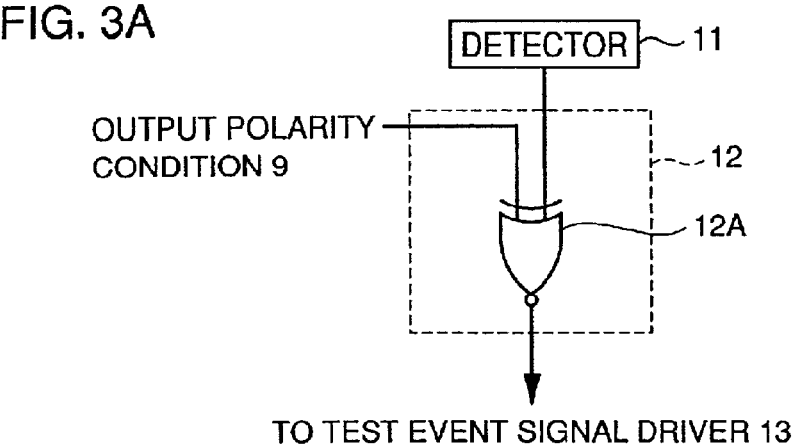
FIG. 3B
| OUTPUT POLARITY | OUTPUT FROM DETECTOR 11 | OUTPUT FROM POLARITY CONVERTER 12 |
|---|---|---|
| 1 | 1 | 1 |
| 1 | 0 | 0 |
| 0 | 1 | 0 |
| 0 | 0 | 1 |
FIG. 3C
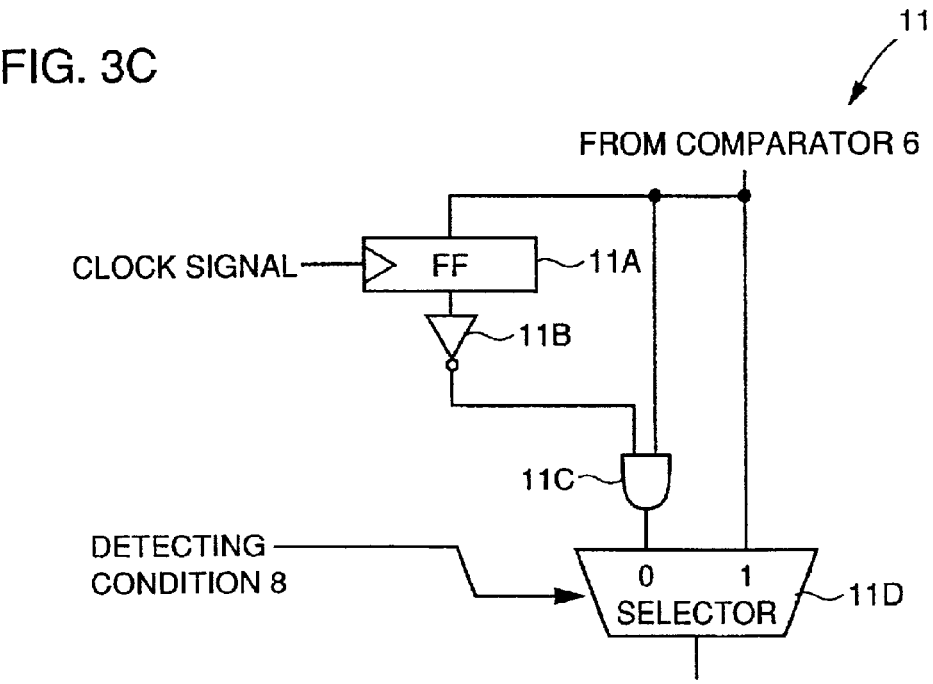

MICROPROCESSOR INTERNALLY PROVIDED WITH TEST CIRCUIT

BACKGROUND OF THE INVENTION

1. Field of the Invention

The present invention relates to microprocessors and, more particularly to a microprocessor internally provided with a test circuit.

2. Description of the Background Art

Referring to FIG. 34, a test circuit 111 for testing the operation of a microprocessor 101 is conventionally connected to microprocessor 101 directly or through an external bus 25.

Microprocessor 101 includes: a memory 24 storing a program and various data; a processor core 22 executing the program stored in memory 24; an external bus interface 26 serving as an interface portion with respect to external bus 25; a processor bus 3 for interconnecting processor core 22, memory 24 and external bus interface 26; and an external event request signal input terminal 28 connected to test circuit 111.

Test circuit 111 directly applies a test event signal 114 to microprocessor 101 for testing microprocessor 101. Test event signal 114 is incorporated into microprocessor 101 from external event request signal input terminal 28 and applied to processor core 22 as an external event request signal 23.

In the structure, data is set by a test program in processor core 22 to a control register (not shown) provided in test circuit 111, so that test event signal 114 is controlled as shown in FIG. 35.

Here, assume that test event signal 114 is in an assert state when it is "High." An assert period of test event signal 114 is determined in synchronization with an operation cycle of test circuit 111 which is determined by operation frequencies of external bus 25 and test circuit 111. Thus, the test program is controlled such that a test instruction 121 is executed with the operation cycle of processor core 22 in synchronization with that of test circuit 111 and that test event signal 114 is asserted at a desired timing.

However, it is difficult to explicitly specify the assert timing of test event signal 114 in a program when controlling the test program. Thus, the execution of the test program must be preliminary simulated.

In some cases, the execution cycle of test instruction 121 and the assert cycle of test event signal 114 are not in synchronization with each other. One example of such cases is related to a change in access time of processor core 22 with respect to an external device connected to external bus 25 or test circuit 111. Another example of such cases is related to a change in pipeline control of processor core 22. The execution cycle of instruction 122 executed in an operation cycle prior to the operation cycles of the elements to be tested may change, thereby resulting in the above mentioned problem. Therefore, the test program must be changed.

SUMMARY OF THE INVENTION

The present invention is made to solve the aforementioned program. An object of the present invention is to provide a microprocessor enabling a test to be performed without simulating a test program.

Another object of the present invention is to provide a microprocessor enabling a test to be performed without changing a program.

A microprocessor according to one aspect of the present invention includes: a processor core executing a program and outputting a program counter value of an instruction included in the program; and a test circuit outputting a test event signal in accordance with the program counter value. The test circuit includes: a PC (Program Counter) setting register holding a set program counter value; an output control register holding an output condition of the test event signal; a comparator connected to the processor core and PC setting register for comparing the program counter value output from the processor core and the program counter value set in the PC setting register; and a test event signal generating portion connected to the comparator and the output control register for generating the test event signal based on the comparison result obtained from the comparator and the output condition.

The test circuit and processor core operate in synchronization with the same clock signal, and a test event signal generated by the test circuit is applied to the processor core. Thus, an operator can readily specify an instruction to be executed in an assert period of the test event signal in a program. In addition, even if the access time of the processor core with respect to the memory or external device is changed, or the instruction execution time is changed due to the change in pipeline control of the processor core, a test can be performed without changing the program.

The test event signal is generated based on the output condition. Thus, the test event signal can be generated according to the purpose of a test.

Preferably, the microprocessor includes a plurality of test circuits, and a switch circuit connected to the plurality of test circuits and the processor core for switching among a plurality of test event signals output from the plurality of test circuits based on preliminary set connecting information for outputting it to the processor core.

If a value retained by the PC setting register or output control register is changed for every test circuit, test event signals based on various conditions can be generated. Thus, test event signals can be generated according to the purpose of a test.

More preferably, the output condition includes a count permitting condition indicating as to if a count operation is permitted in the assert period of the test event signal. The test circuit further includes a count value setting register holding a set count value. The test event signal generating portion includes a detector connected to the comparator, output control register and count value setting register for counting a period during which a comparison result from the comparator is a prescribed value in accordance with the count value held by the count value setting register when the count operation is permitted based on the count permitting condition and detecting the test event signal based on the count result.

The period during which the comparison result from the comparator is a prescribed value is counted and the test event signal is generated. Thus, during a loop process, the test event signal can also be asserted in a prescribed loop.

More preferably, the microprocessor further includes an external bus interface outputting a wait count value indicating a period before bus access on the external bus is permitted and externally connecting the microprocessor. The output condition includes a wait reference permitting condition indicating as to if reference to a wait count value is permitted in generating the test event signal. The test event signal generating portion includes a detector connected to the comparator, output control register and external bus interface for detecting an assert period of the test event signal when reference to the wait count value is permitted based on the wait reference permitting condition and when the wait count value output from the external bus interface is a prescribed value.

The test event signal can be asserted only in a period in which data access on the external bus is permitted. The test event signal is controlled in accordance with the wait count value. Thus, even if the access time of the processor core with respect to the external device is changed, the test event signal can be asserted only in a period when data access is permitted after the change in access time using a test program before the change in access time.

More preferably, the microprocessor further includes an external bus interface receiving a ready signal indicating that the bus access over the external bus is permitted and externally connecting the microprocessor. The output condition includes a ready signal reference permitting condition indicating as to if reference to the ready signal is permitted in generating the test event signal. The test event signal generating portion includes a detector connected to the comparator, output control register and external bus interface for detecting an asset period of the test event signal in accordance with the ready signal when reference to the ready signal is permitted based on the ready signal reference permitting condition.

The test event signal can be asserted only in a period when data access over the external bus is permitted. The test event signal is controlled in accordance with the wait count value. Thus, even if the access time of the processor core with respect to the external device is changed, the test event signal can be asserted only in a period when data access is permitted after the change in access time using a test program before the change in access time.

A microprocessor according to another aspect of the present invention includes: a processor core executing a program, outputting a program counter value of an instruction included in the program, and receiving a plurality of event request signals for executing a prescribed instruction in response to each event request signal; a test circuit generating and outputting a test event signal in accordance with the program counter value; a plurality of external terminals each receiving an external signal; a plurality of interconnections respectively connected to the plurality of external terminals and each transferring an external signal received from the connected external terminal as the event request signal to the processor core; and a switch circuit receiving the test event signal output from the test circuit, determining as to if the test event signal is to be supplied to each of said plurality of interconnections as the event request signal.

The test event signal generated by the test circuit is applied to the processor core. Thus, an instruction to be executed in an assert period of the test event signal can readily be specified in a program. In addition, even if the access time of the processor core with respect to the memory is changed, or external device or an instruction execution time is changed due to a change in pipeline control of the processor core, the test can be performed without changing the program.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A to 3C are diagrams shown in conjunction with the hardware structure and operation of a polarity converter 12 and detector 11 according to the first embodiment.

output polarity condition is "High," and count permitting condition is "permit."

Figure 24:
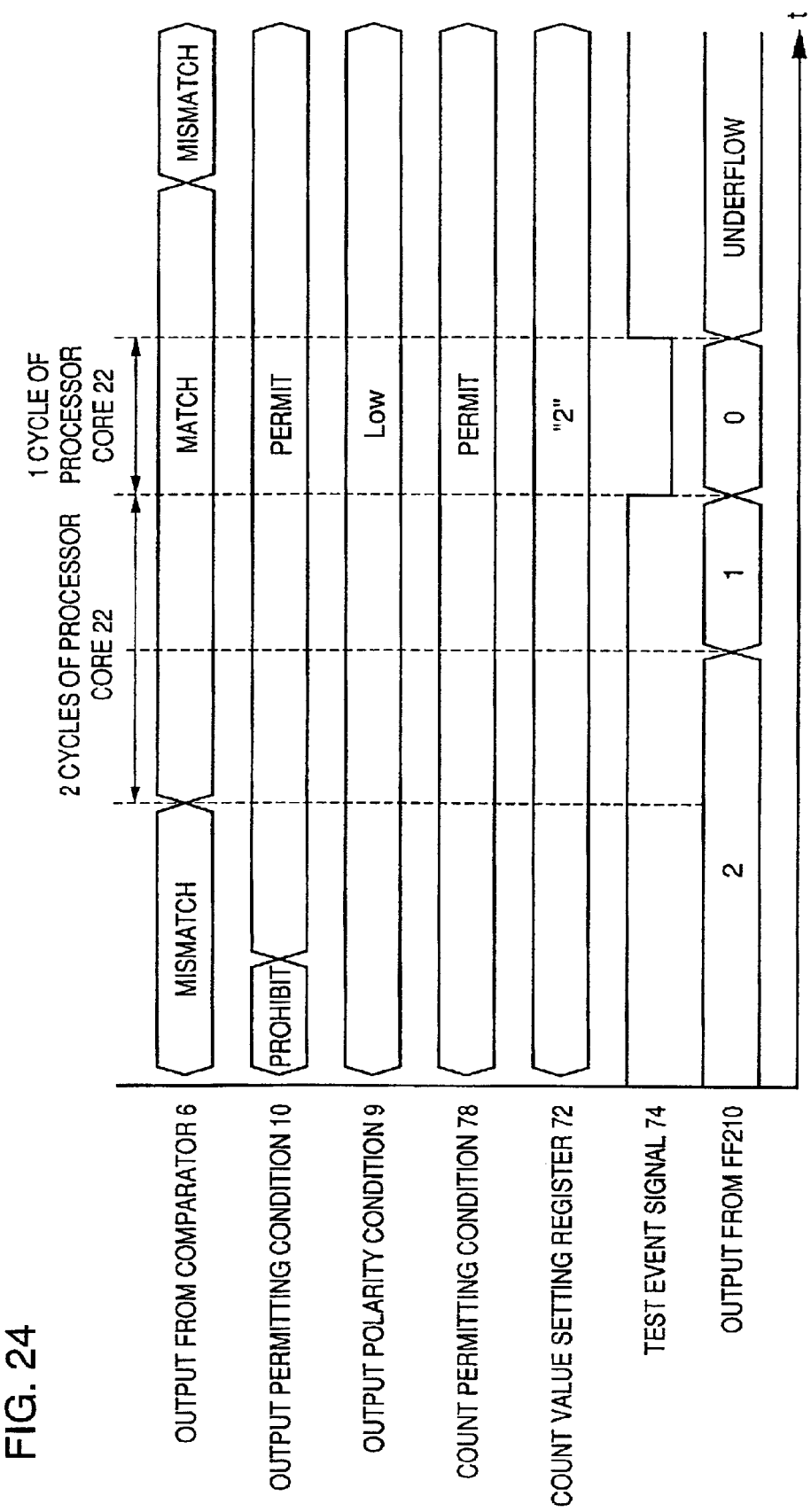

FIG. 24 is a diagram showing a waveform of the test event signal when the output permitting condition is "permit," output polarity condition is "Low," and count permitting condition is "permit."

Figure 25:
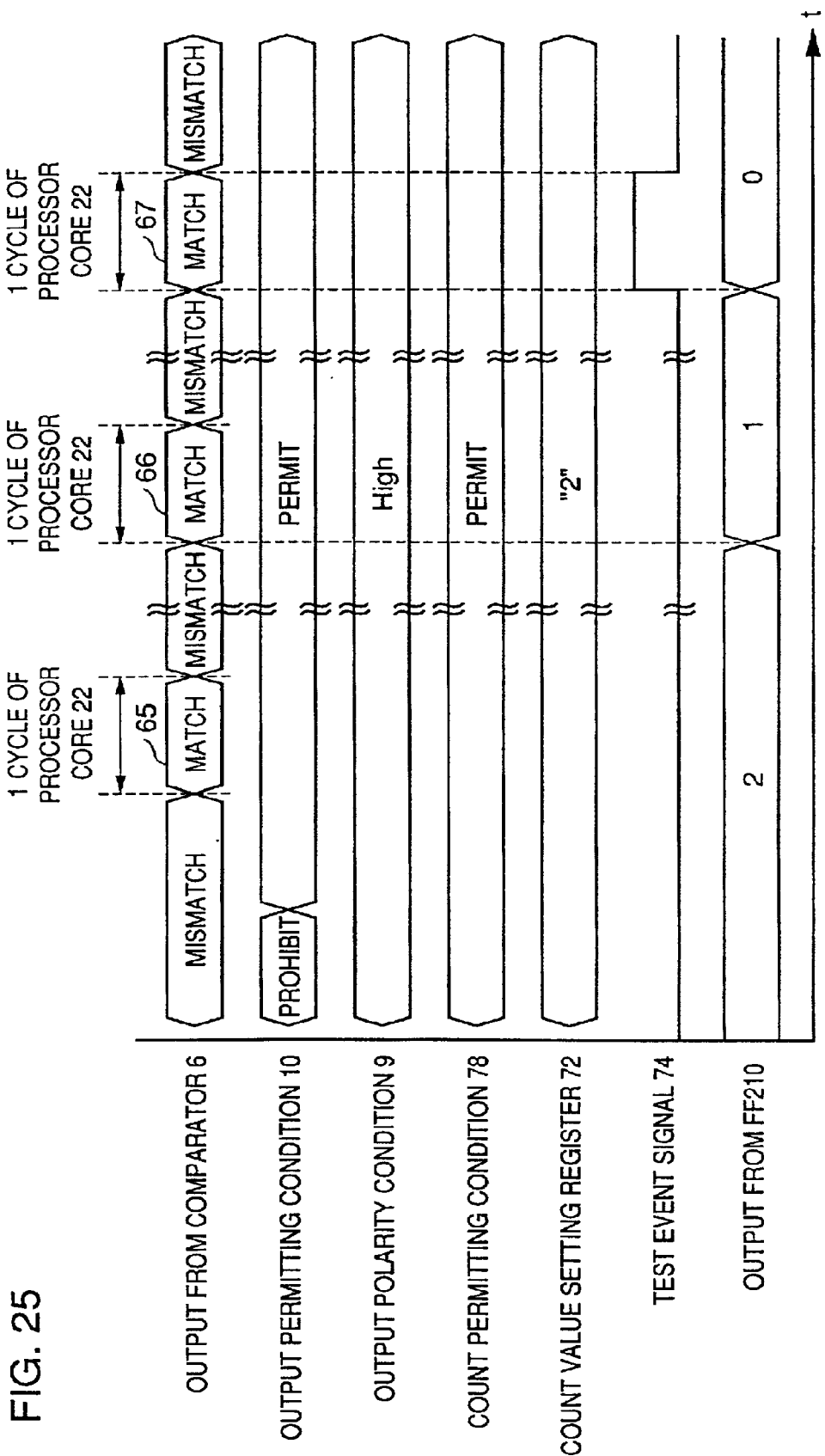

FIG. 25 is a diagram showing a waveform of the test event signal when the output permitting condition is "permit," output polarity condition is "High," and count permitting condition is "permit," and when a value set in a counter is greater than a matching cycle of a PC comparison result.

Figure 26:
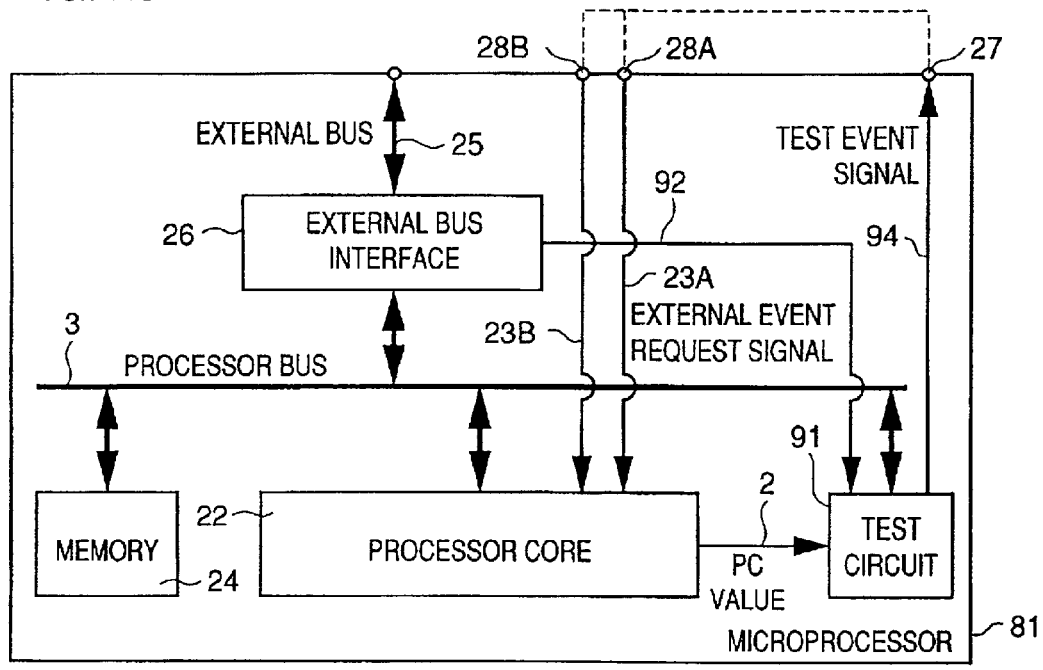

FIG. 26 is a diagram showing a hardware structure of a microprocessor according to the fourth embodiment of the present invention.

Figure 27:
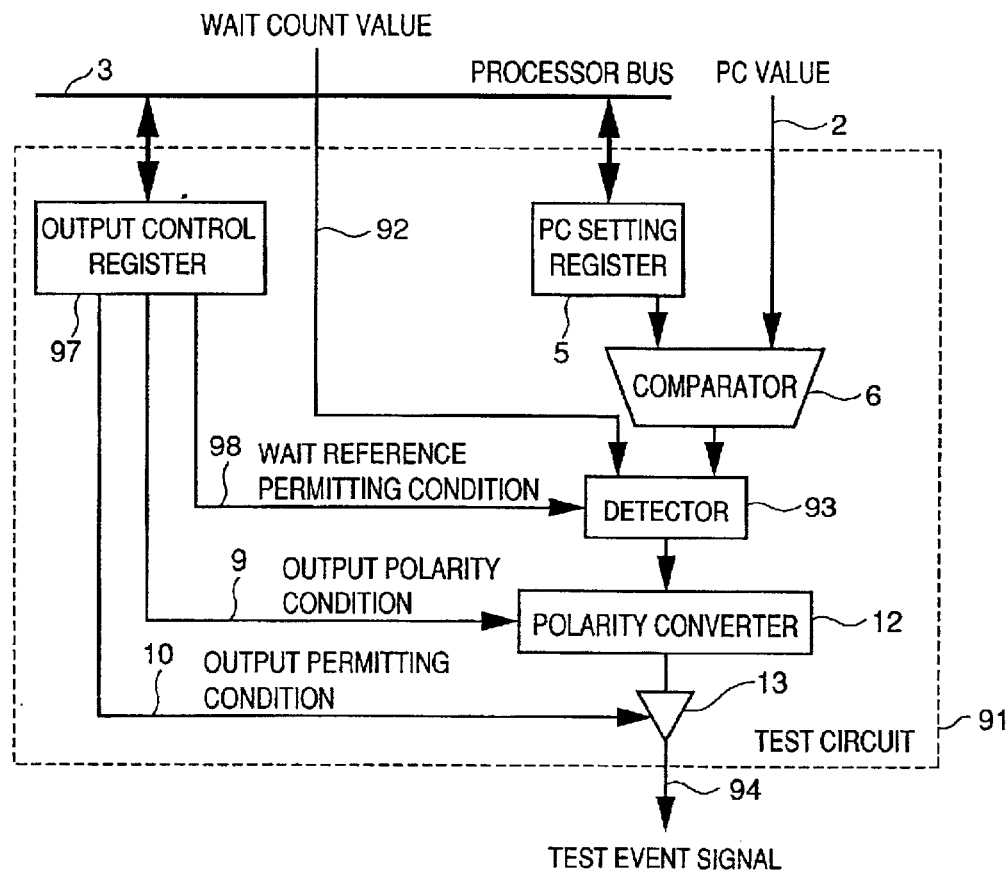

FIG. 27 is a diagram showing a hardware structure of a test circuit according to the fourth embodiment.

Figure 28:
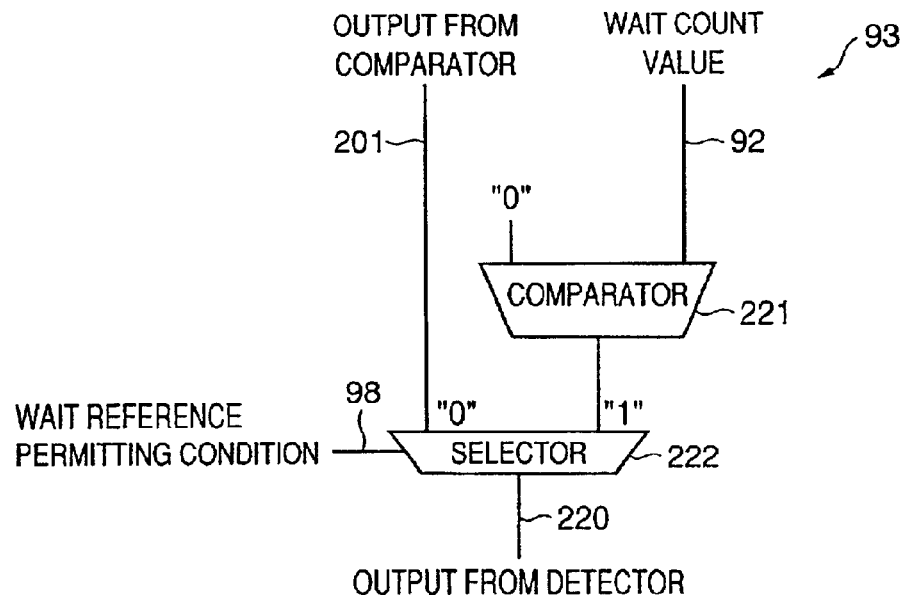

FIG. 28 is a block diagram showing a hardware structure of a detector 93 according to the fourth embodiment.

Figure 29:
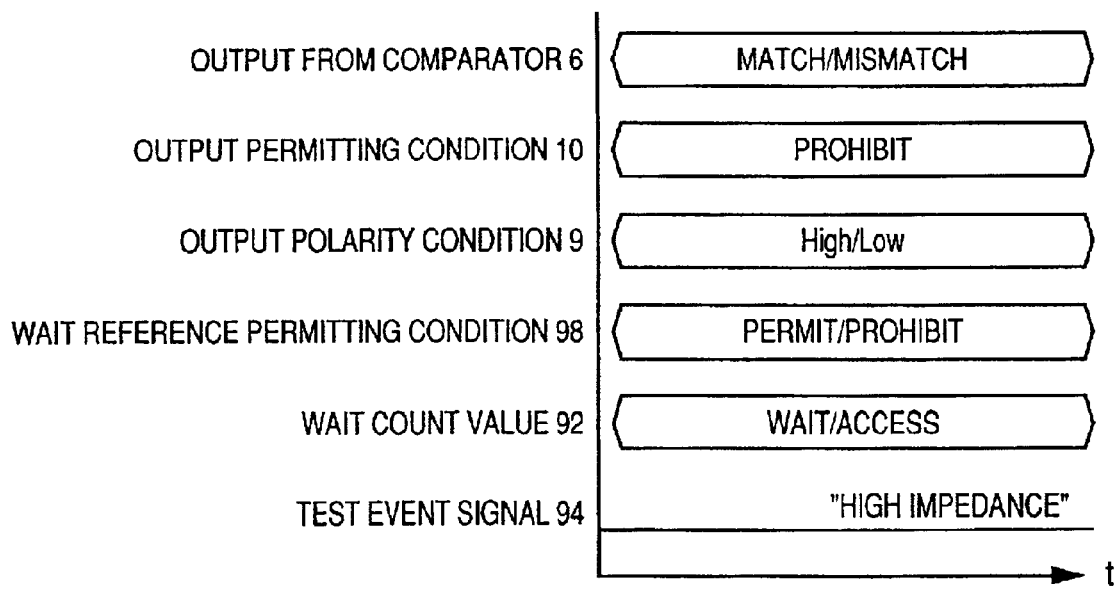

FIG. 29 is a diagram showing a waveform of a test event signal when an output permitting condition is "prohibit."

Figure 30:
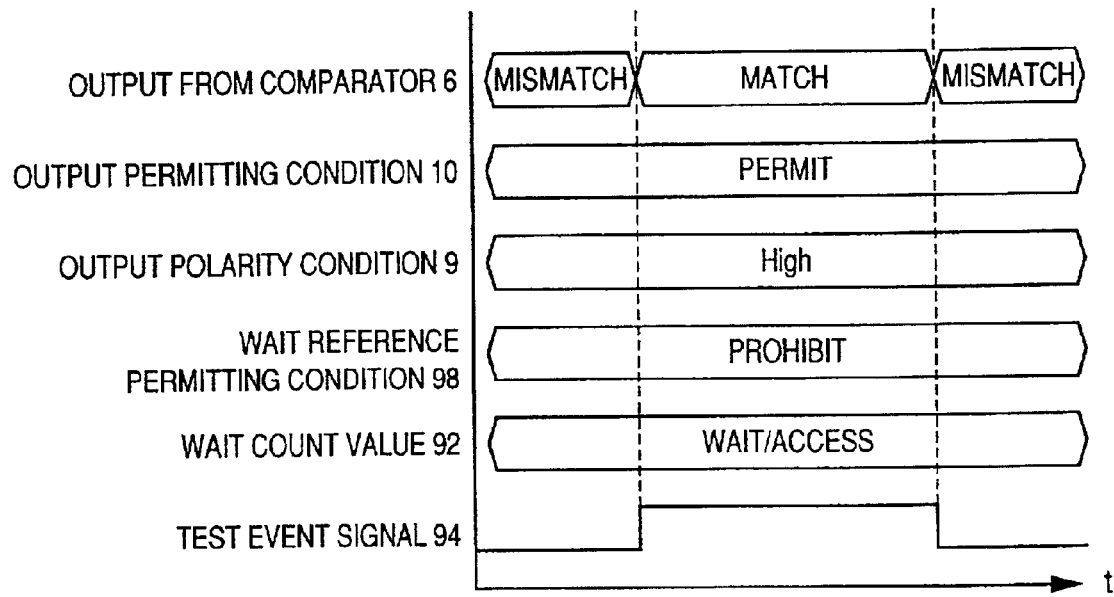

FIG. 30 is a diagram showing a waveform of the test event signal when the output permitting condition is "permit," output polarity condition is "High," and wait reference permitting condition is "prohibit."

Figure 31:
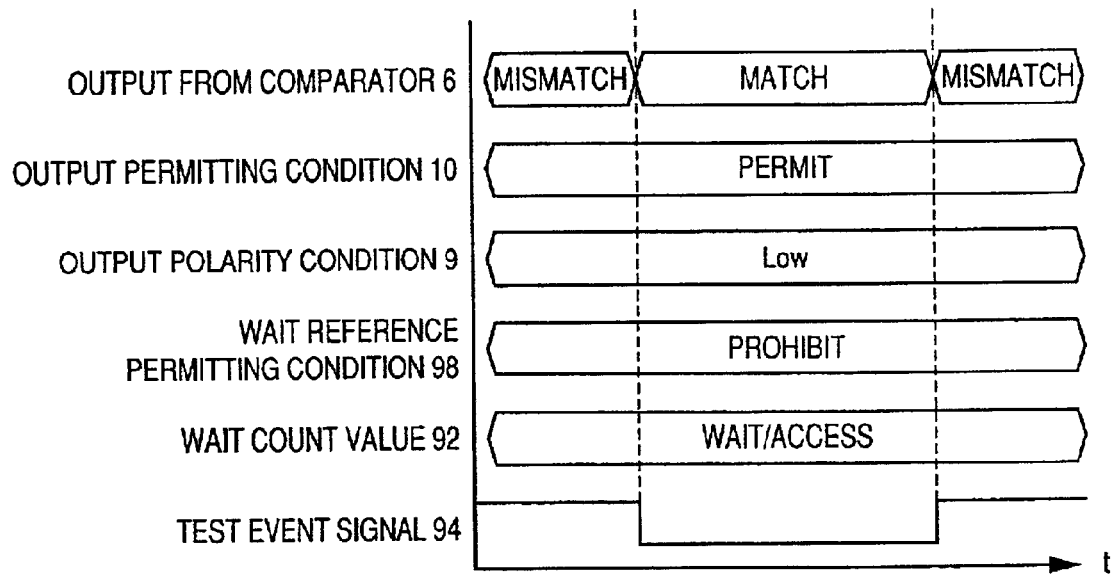

FIG. 31 is a diagram showing a waveform of the test event signal when the output permitting condition is "permit," output polarity condition is "Low," and wait reference permitting condition is "prohibit."

Figure 32:
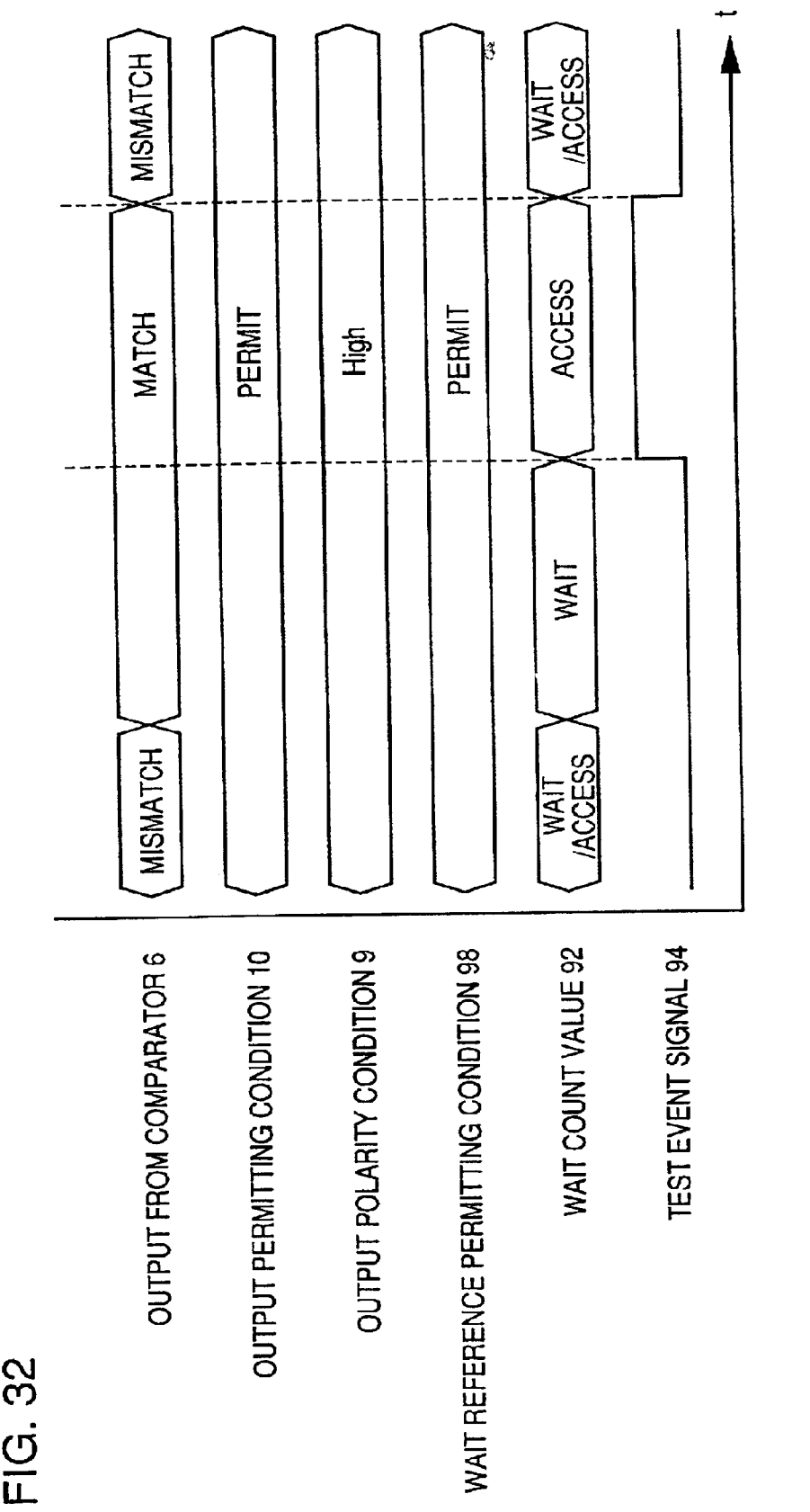

FIG. 32 is a diagram showing a waveform of the test event signal when the output permitting condition is "permit," output polarity condition is "High," and wait reference permitting condition is "permit."

Figure 33:
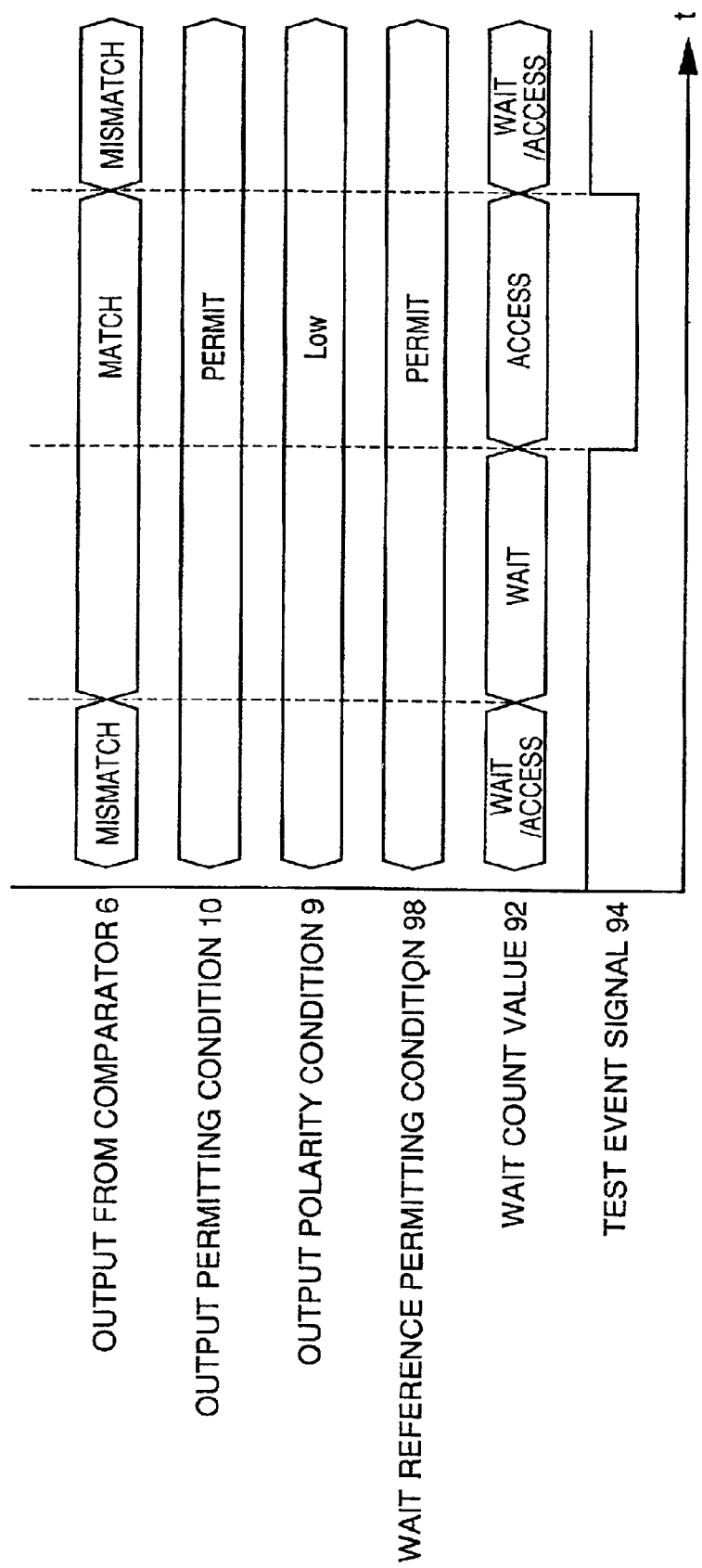

FIG. 33 is a diagram showing a waveform of the test event signal when the output permitting condition is "permit," output polarity condition is "Low," and wait reference permitting condition is "permit."

Figure 34:
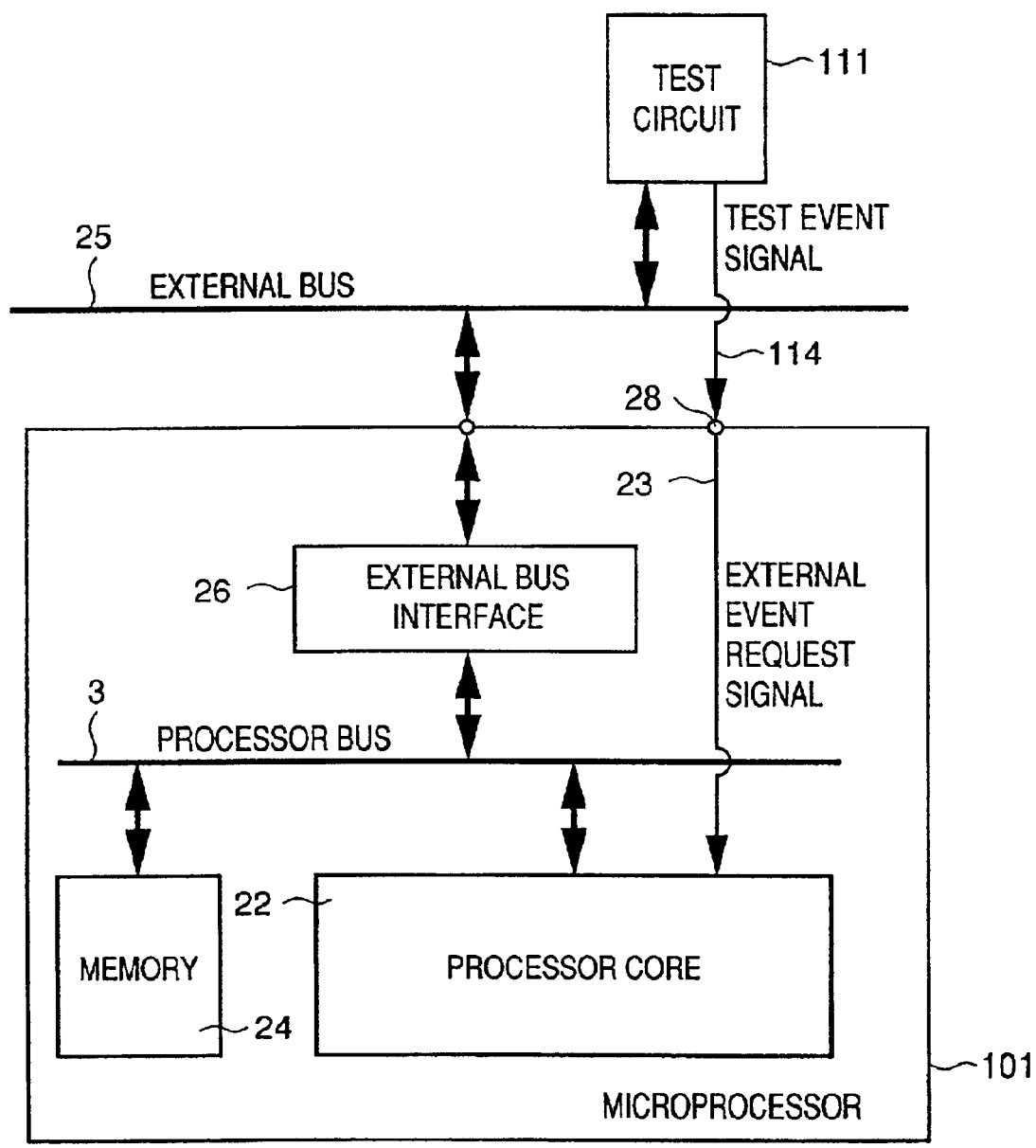

FIG. 34 is a diagram showing a hardware structure of a conventional microprocessor and test circuit.

Figure 35:
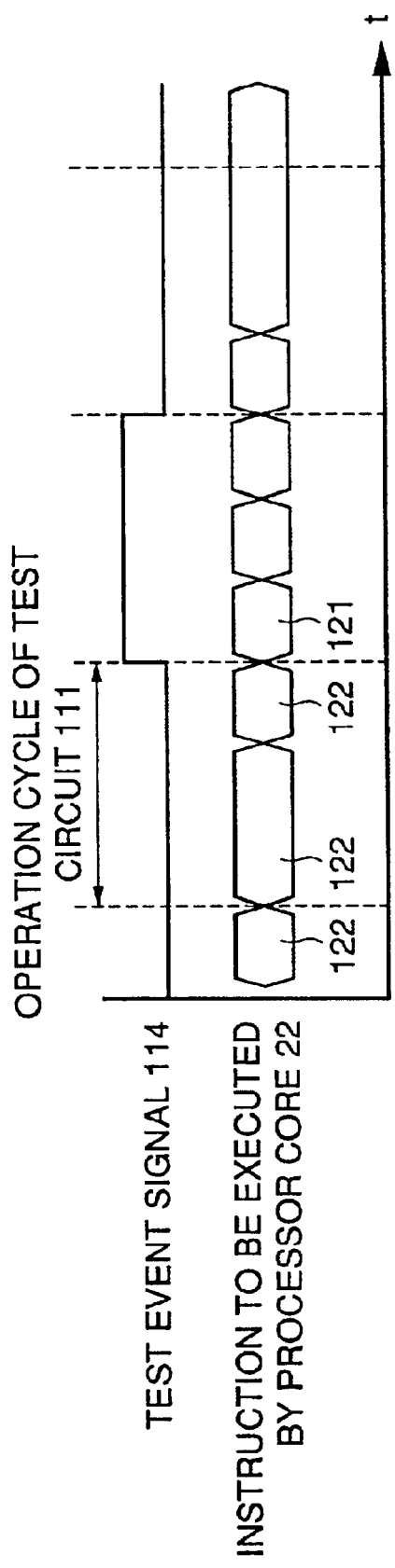

FIG. 35 is a diagram showing a waveform of a test event signal in a conventional test.

DESCRIPTION OF THE PREFERRED EMBODIMENTS

First Embodiment

Figure 1:
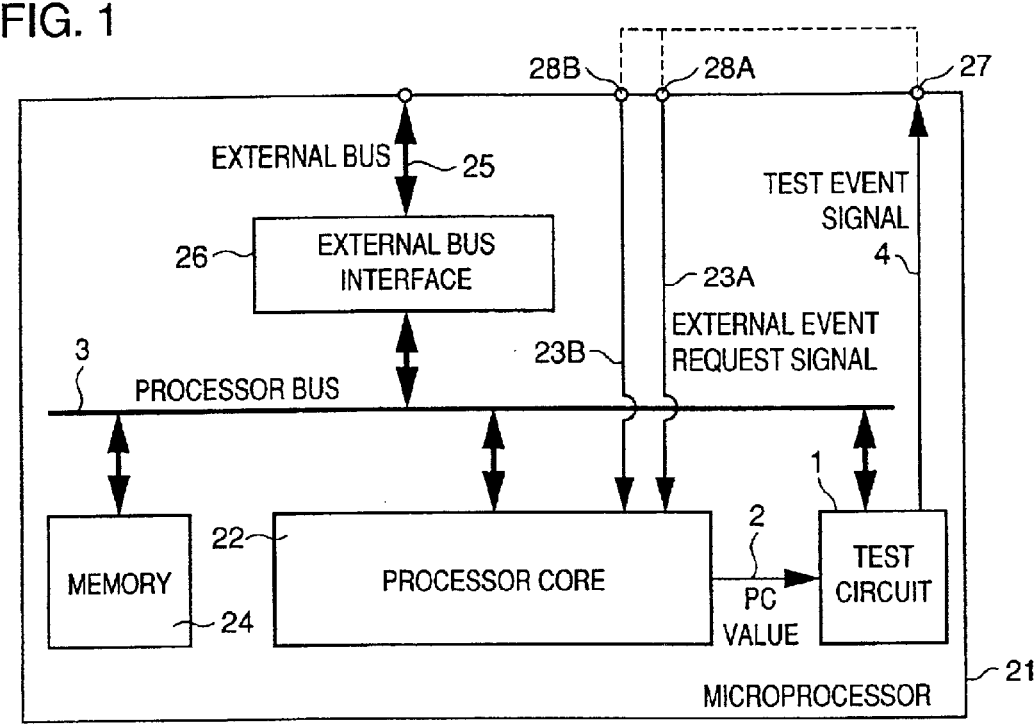
FIG. 1 is a diagram showing an arrangement of a hardware of a microprocessor according to the first embodiment of the present invention.

Referring to FIG. 1, a microprocessor 21 internally provided with a test circuit 1 according to the first embodiment of the present invention includes: a memory 24 storing a program and various data; a processor core 22 executing the program stored in memory 24; an external bus interface 26 serving as an interface portion with respect to external bus 25 connected to an external device; and a test circuit 1 connected to processor core 22 and receiving a program counter value (hereinafter referred to as "a PC value") 2 of an instruction of processor core 22 for outputting a test event signal 4 for testing microprocessor 21. Here, test circuit 1 and processor core 22 operate in synchronization with the same clock signal.

Microprocessor 21 further includes: a processor bus 3 for interconnecting processor core 22, memory 24, external bus interface 26, and test circuit 1; a test event signal output terminal 27 for outputting a test event signal 4 to an external portion of microprocessor 21; and external event request signal input terminal 28 (28A, 28B) provided for applying to processor core 22 an external event request signal 23 (23A, 23B) used by the external device to notify an event request with respect to processor core 22.

Figure 2:
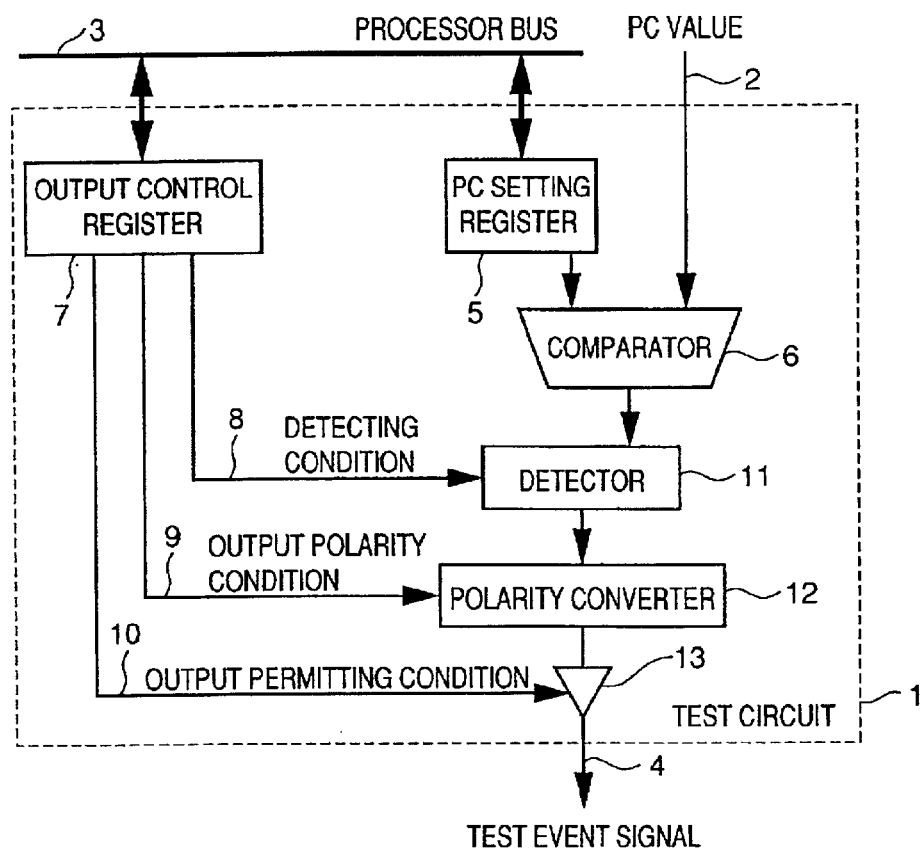
FIG. 2 is a diagram showing an arrangement of the hardware of the test circuit according to the first embodiment.

Referring to FIG. 2, test circuit 1 includes: a PC setting register 5 connected to processor bus 3 and storing a PC value corresponding to a timing at which test event signal 4 is to be asserted; an output control register 7 connected to processor bus 3 and storing an output condition of test event signal 4; and a comparator 6 comparing PC value 2 and the value stored in PC setting register 5.

Test circuit 1 further includes: a detector 11 connected to comparator 6 and output control register 7 for detecting an assert period of test event signal 4 based on the comparison result of comparator 6 and a detecting condition 8 of the assert period of test event signal 4 stored in output control register 7; a polarity converter 12 connected to detector 11 and output control register 7 for determining an output polarity of test event signal 4 based on an output from detector 11 and an output polarity condition 9 when test event signal 4 stored in output control register 7 is asserted; and a test event signal driver 13 connected to polarity converter 12 and output control register 7 for outputting a test event signal 4 based on an output from polarity converter 12 and an output permitting condition 10 of test event signal 4 stored in output control register 7.

Referring to FIG. 3A, polarity converter 12 includes an Exclusive-Nor gate 12A receiving the output from detector 11 and output polarity condition 9 for outputting a negation value of an exclusive OR. FIG. 3B shows a relationship among the output from detector 11, output polarity condition 9 and Exclusive-Nor gate 12A. If the output of detector 11 is 1 and that of output polarity condition 9 is 0, Exclusive-Nor gate 12A outputs 0.

Referring to FIG. 3C, detector 11 includes: an FF circuit 11A connected to an output of comparator 6, operating in synchronization with the same clock signal as processor core 22, and delaying the output from comparator 6 by one clock for output; an inverter 11B connected to FF circuit 11A; an AND gate 11C connected to comparator 6 and inverter 11B and receiving as inputs the outputs from comparator 6 and inverter 11B; and a selector 11D connected to the outputs of comparator 6 and AND gate 11C for directing one of the outputs from comparator 6 and AND gate 11C to an output.

Now, the operations of test circuit 1 and microprocessor 21 will be described.

Referring to FIG. 2, test circuit 1 controls an output value of test event signal 4 in accordance with a PC value 2 of processor core 22 and values of PC setting register 5 and output control register 7. The values of PC setting register 5 and output control register 7 are set by a program executed in processor core 22 through processor bus 3. An operator testing microprocessor 32 sets the PC value of an instruction to be executed when test event signal 4 is asserted in PC setting register 5. Comparator 6 compares PC value 2 of processor core 22 and the value of PC setting register 5 which has been set by the operator for outputting a comparison result.

The operator can set detecting condition 8, output polarity condition 9, and output permitting condition 10 in output control register 7. When the assert period of test event signal 4 is detected as detecting condition 8, a determination can be made as to if the comparison result of comparator 6 is subjected to level detection or edge detection. In addition, a type ("High" or "Low") of a signal output in the assert period of test event signal 4 can be set as output polarity condition 9. Further, a determination can be made as to if the output of test event signal 4 is permitted or prohibited, as output permitting condition 10.

Referring to FIG. 3C, detecting condition 8 designates "level detect" at an H level and "edge detect" at an L level.

When detecting condition 8 is at the H level, selector 11D selects and outputs the output from comparator 6. When detecting condition 8 is at the L level, selector 11D selects and outputs the output from AND gate 11C. Namely, when detecting condition 8 is "level detect," detector 11 detects a period when the comparison results of comparator 6 is "match" as an assert period. When detecting condition 8 is "edge detect," detector 11 detects as an assert period only a period corresponding to one operation cycle of processor core 22 after the point at which the comparison result is changed from "mismatch" to "match."

Polarity converter 12 outputs a value set as output polarity condition 9 when detector 11 detects the assert period and outputs a value opposite to the value set as output polarity condition 9 if the assert period is not detected. In the arrangement shown in FIG. 3A, detector 11 detects the assert period when the output from detector 11 is 1.

Test event signal driver 13 outputs as test event signal 4 an output value of polarity converter 12 when output permitting condition 10 is "permit."

FIGS. 4 to 8 show a relationship among the above mentioned set value of output control register 7, the output from comparator 6, and test event signal 4.

Figure 4:
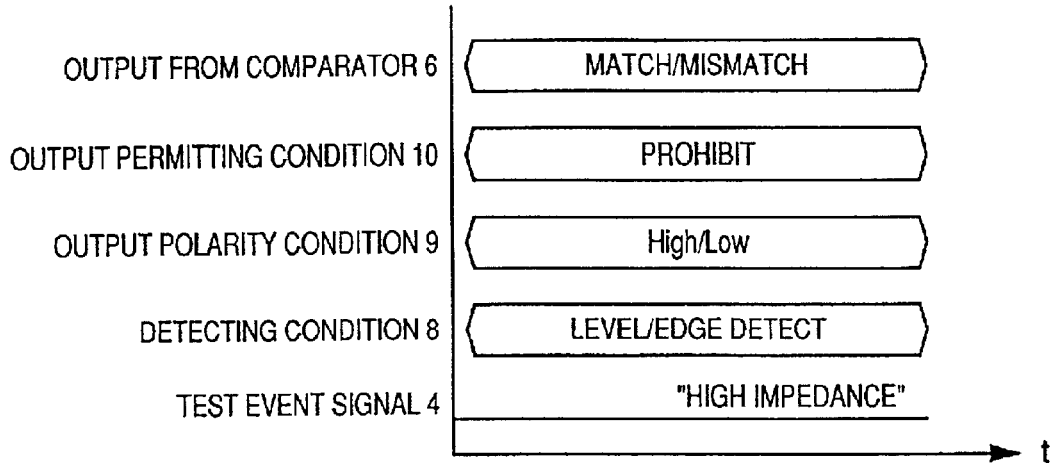
FIG. 4 is a diagram showing a waveform of a test event signal when an output permitting condition is "prohibit."

Referring to FIG. 4, when output permitting condition 10 is "prohibit," test event signal 4 is brought into a high impedance state regardless of the comparison result of comparator 6, output polarity condition 9, or detecting condition 8.

When output permitting condition 10 is "permit," the operation of test event signal 4 differs according to the comparison result of comparator 6, the output value of output polarity condition 9 or detecting condition 8.

Figure 5:
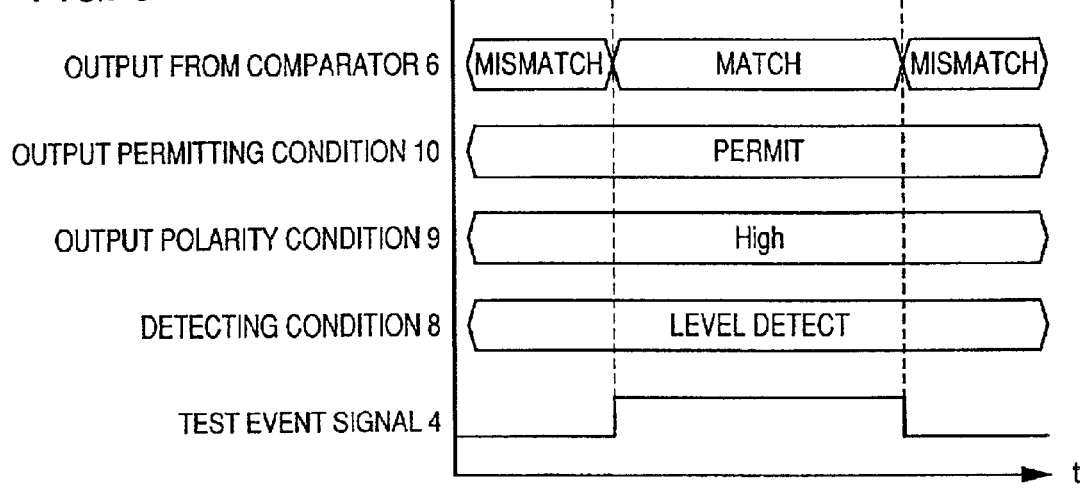
FIG. 5 is a diagram showing a waveform of the test event signal when the output permitting condition is "permit," output polarity condition is "High," and detecting condition is "level detect."

Referring to FIG. 5, test event signal 4 will be described when output permitting condition 10 is "permit," output polarity condition 9 is "High," and detection condition 8 is "level detect." The value of test event signal 4 is respectively "Low" and "High" when the comparison result of comparator 6 is "mismatch" and "match."

Figure 6:
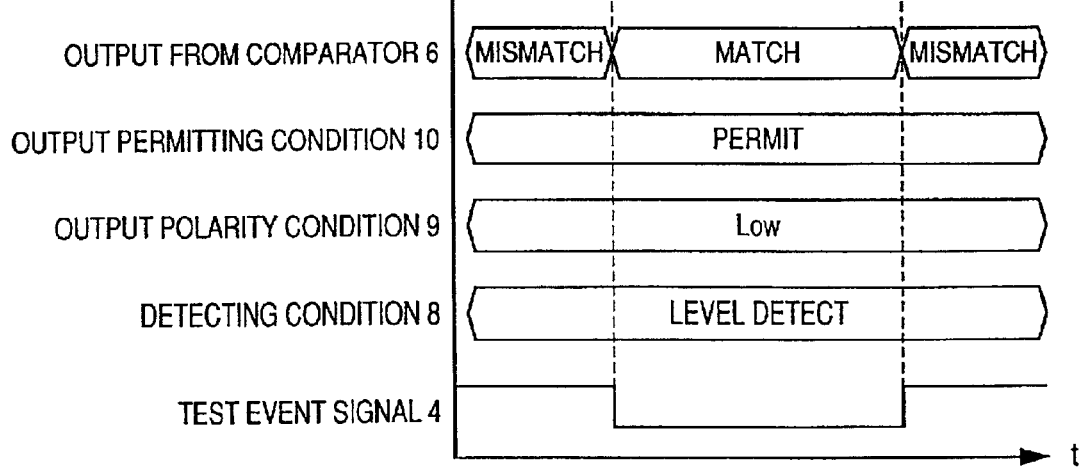
FIG. 6 is a diagram showing a waveform of the test event signal when the output permitting condition is "permit," output polarity condition is "Low," and detecting condition is "level detect."

Referring to FIG. 6, test event signal 4 when output permitting condition 10 is "permit," output polarity condition 9 is "Low," and detecting condition 8 is "level detect" will be described. The value of test event signal 4 is respectively "High" and "Low" when the comparison result is "mismatch" and "match", so that only the signal polarity is different from the case of FIG. 5.

Figure 7:
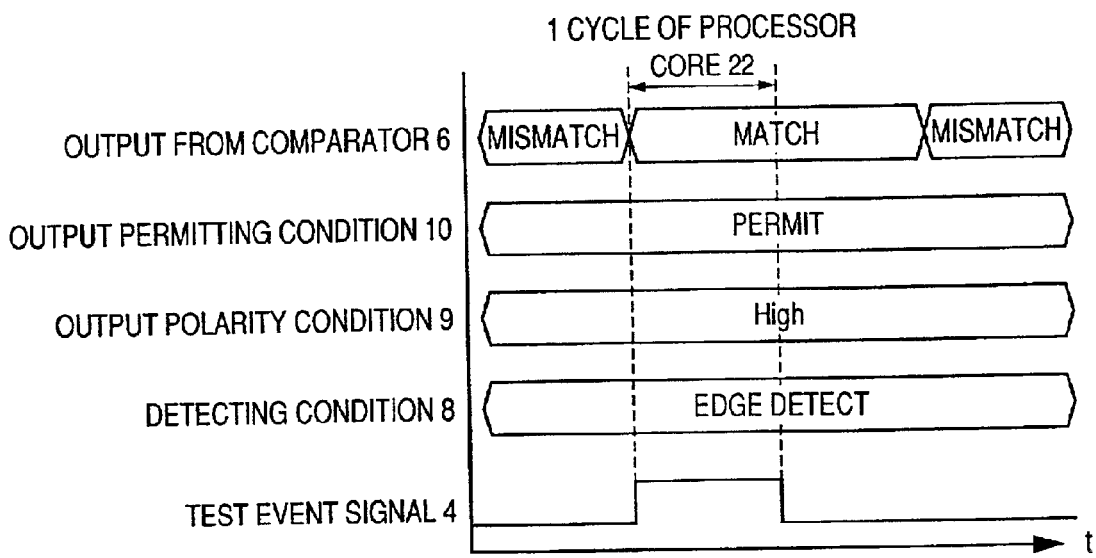
FIG. 7 is a diagram showing a waveform of the test event signal when the output permitting condition is "permit," output polarity condition is "High," and detecting condition is "edge detect."

Referring to FIG. 7, test event signal 4 when output permitting condition 10 is "permit," output polarity condition 9 is "High," and detecting condition 8 is "edge detect" will be described. The value of test event signal 4 is "High" only for one operation cycle of processor core 22 when the comparison result is changed from "mismatch" to "match." In all the other cases, the value of test event signal 4 is "Low."

Figure 8:
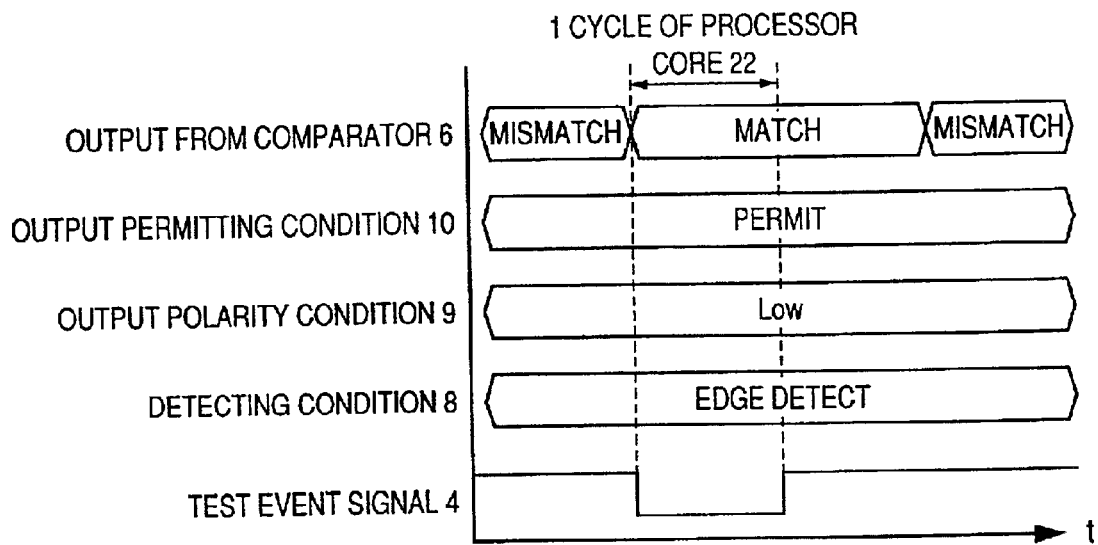
FIG. 8 is a diagram showing a waveform of the test event signal when an output permitting condition is "permit," output polarity condition is "Low," and detecting condition is "edge detect."

Referring to FIG. 8, test event signal 4 when output permitting condition 10 is "permit," output polarity condition 9 is "Low," and detecting condition 8 is "edge detect" will be described. The value of test event signal 4 is "Low" only for one operation cycle of processor core 22 when the comparison result is changed from "mismatch" to "match." In all the other cases, the value of test event signal 4 is "High." Thus, only the signal polarity is different from the case of FIG. 7.

Test event signal 4 having the above mentioned value is output to an external portion of microprocessor 21 through test event signal output terminal 27. In the external portion of microprocessor 21, test event signal output terminal 27 and an arbitrary external event request signal input terminal 28 are connected, and an arbitrary external event request signal 23 is applied to a program operating in processor core 22. The program tests microprocessor 21 in accordance with external event request signal 23.

Microprocessor 21 described in the first embodiment can use test event signal 4 as external event request signal 23. Test event signal 4 is generated in synchronization with PC value 2 of an instruction of processor core 22. Thus, the instruction to be executed in the assert period of external event request signal 23 can readily be specified in a test program. In addition, even if the access time of processor core 22 with respect to memory 24 or external device is changed, or as well as an instruction execution period is changed due to the change in pipeline control of processor core 22, microprocessor 21 can be tested without changing the test program.

Test event signal 4 and external event request signal 23 can be connected in any combination. For example, if test event signal output terminal 27 and a plurality of external event request signal input terminals 28 are connected at the same time, a plurality of external event request signals 23 generated under the same condition can be applied to various portions of processor core 22. In addition, if a plurality of test circuits 1 are provided in microprocessor 21 and a plurality of test event signal output terminals 27 are arranged to be connected to desired output event request signal input terminals 28, respectively, a plurality of external event request signals 23 can be generated under different conditions.

Test event signal output terminal 27 is not necessarily connected to external event request signal input terminal 28 of microprocessor 21. If test event signal output terminal 27 is connected to the external device or another microprocessor, test event signal 4 can be applied as the external event request signal to these devices. Thus, test or debug of the external device or another microprocessor can be performed in synchronization with an execution sequence of microprocessor 21.

Test event signal 4 is generated based on the output condition set in output control register 7. Thus, the test event signal can be generated according to the purpose of a test.

In the above description, test event signal output terminal 27 and external event request signal input terminal 28 are connected such that test event signal 4 of microprocessor 21 is used as external event request signal 23. However, if it is preliminary known that test event signal 4 is used as external event request signal 23 and there is no need to apply test event signal 4 to the external device or the like, test circuit 1 and processor core 22 are connected, an interconnection supplying test event signal 4 as the external event request signal to processor 22 is arranged in processor 32, such that test event signal 4 (external event request signal 23) is directly applied to processor core 22 from test circuit 1. Then, test event signal output terminal 27 needs not be provided.

When an output control condition of test event signal 4 is fixed, a similar effect may be produced even if one of detecting condition 8, output polarity condition 9 and output permitting condition 10 included in output control register 7 is fixed. In such a case, information in output control register 7 which can be fixed is erased and one of detector 11, polarity converter 12 and test event signal driver 13 corresponding to the information is removed to form test circuit 1.

In the present embodiment, the value of output control register 7 is set by the program. However, a similar effect can be produced if the value of output control register 7 is partially or entirely set through an external pin.

Although detecting condition 8, output polarity condition 9 and output permitting condition 10 are held in the same output control register, they may be held in different registers. For example, test circuit 1 may be provided with three output control registers respectively receiving and holding detecting condition 8, output polarity condition 9, and output permitting condition 10 through a processor bus 3. Further, test circuit 1 may be provided with one output control register respectively receiving and holding two of detecting condition 8, output polarity condition 9 and output permitting condition 10 through processor bus 3, and another output control register receiving and holding the remaining one of detecting condition 8, output polarity condition 9 and permitting condition 10 through processor bus 3.

Second Embodiment

Figure 9:
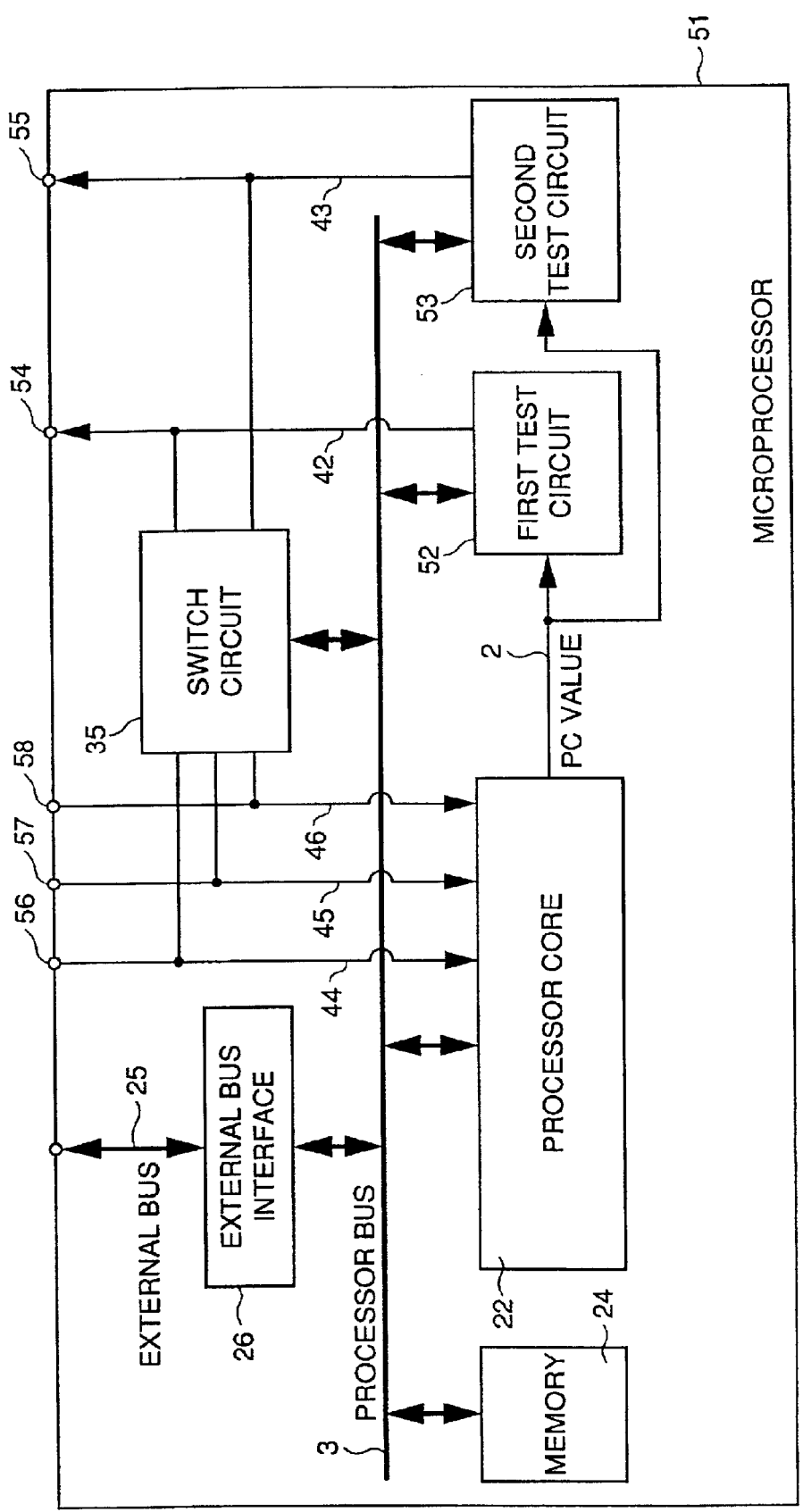
FIG. 9 is a diagram showing an arrangement of a hardware of a microprocessor according to the second embodiment of the present invention.

Referring to FIG. 9, a microprocessor 51 internally provided with first and second test circuits 52 and 53 according to the second embodiment of the present invention includes: a memory 24 storing a program and various data; a processor core 22 executing the program stored in memory 24; an external bus interface 26 serving as an interface portion with respect to an external bus 25 connected to an external device; first and second test circuits 52 and 53 connected to processor core 22 and receiving a PC value 2 of an instruction of processor core 22 for respectively outputting first and second test event signals 42 and 43 for testing microprocessor 51; and a switch circuit 35 connected to the first and second test circuits 52 and 53 and switching between first and second test event signals 42 and 43 for applying it to processor core 22 as first to third external event request signals 44 to 46.

Microprocessor 51 further includes: a processor bus 3 for interconnecting processor core 22, memory 24, external bus interface 26, switch circuit 35, and first and second test circuits 52 and 53; test event signal output terminals 54 and 55 respectively outputting first and second test event signals 42 and 43 to an external portion of microprocessor 21; and external event request signal input terminals 56 to 58 respectively provided for applying to processor core 22 first to third external event request signals 44 to 46 used by the external device to notify an event request with respect to processor core 22.

Figure 10:
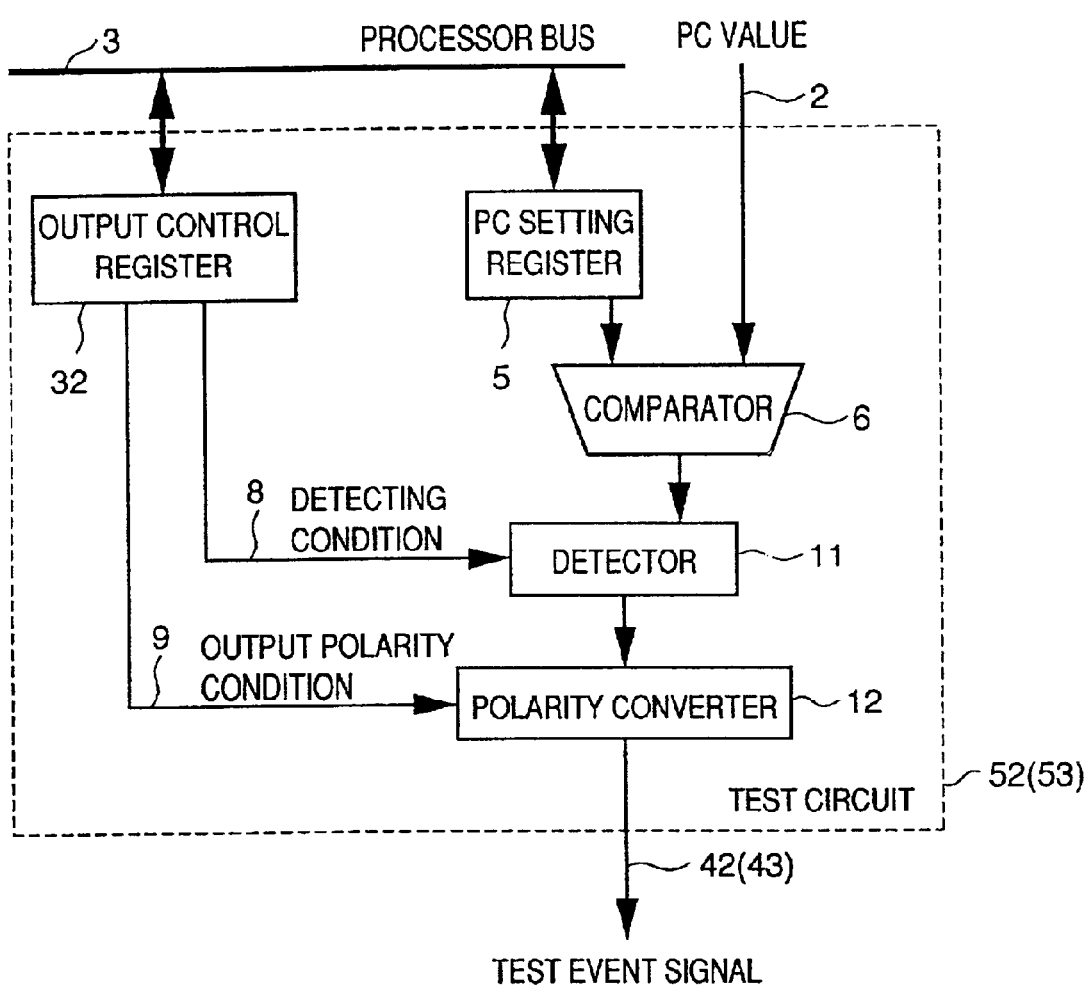
FIGS. 10 and 11 are diagrams respectively showing hardware structures of test and switch circuits according to the second embodiment.

Referring to FIG. 10, first test circuit 52 includes: a PC setting register 5 connected to processor bus 3 for storing a PC value asserting test event signal 4; an output control register 32 connected to processor bus 3 for storing an output condition of test event signal 4; and a comparator 6 comparing PC value 2 and the value stored in PC setting register 5.

First test circuit 52 further includes: a detector 11 connected to output control register 32 and comparator 6 for detecting an assert period of first test event signal 42 based on the comparison result of comparator 6 and a detecting condition 8 of the assert period of first test event signal 42 stored in output control register 32; and a polarity converter 12 connected to detector 11 and output control register 32 for determining an output polarity of first test event signal 42 based on the output from detector 11 and output polarity condition 9 in the assert period of first test event signal 42 stored in output control register 32 and outputting first test event signal 42.

The hardware structure of second test circuit 53 is similar to that of first test circuit 52, and therefore detailed description thereof will not be repeated here.

Figure 11:
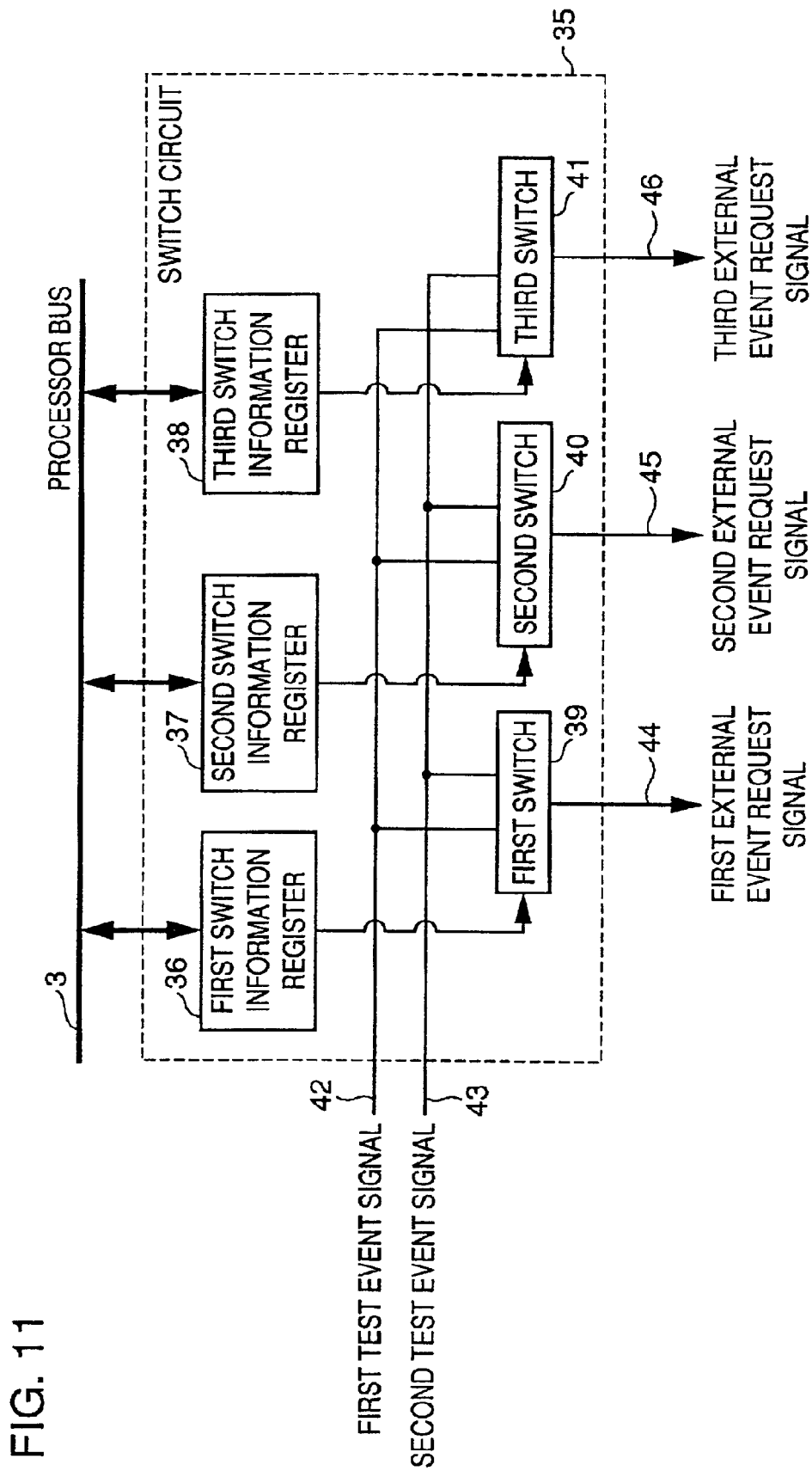

Referring to FIG. 11, switch circuit 35 includes: first to third switch information registers 36 to 38 connected to processor bus 3 for storing connecting information; and a first switch 39 connected to first switch information register 36 and first and second test circuits 52, receiving first and second test event signals 42 and 43, and outputting one of first and second test event signals 42 and 43 as first external event request signal 44 based on the connecting information stored in first switch information register 36.

Switch circuit 35 further includes: a second switch 40 connected to a second switch information register 37 and first and second test circuits 52, receiving first and second test event signals 42 and 43, and outputting one of first and second test event signals 42 and 43 as second external event request signal 45 based on the connecting information stored in second switch information register 37; and a third switch 41 connected to a third switch information register 38 and first and second test circuits 52, receiving first and second test event signals 42 and 43, and outputting one of first and second test event signals 42 and 43 as a third external event request signal 46 based on the connecting information stored in third switch information register 38.

Figure 12:
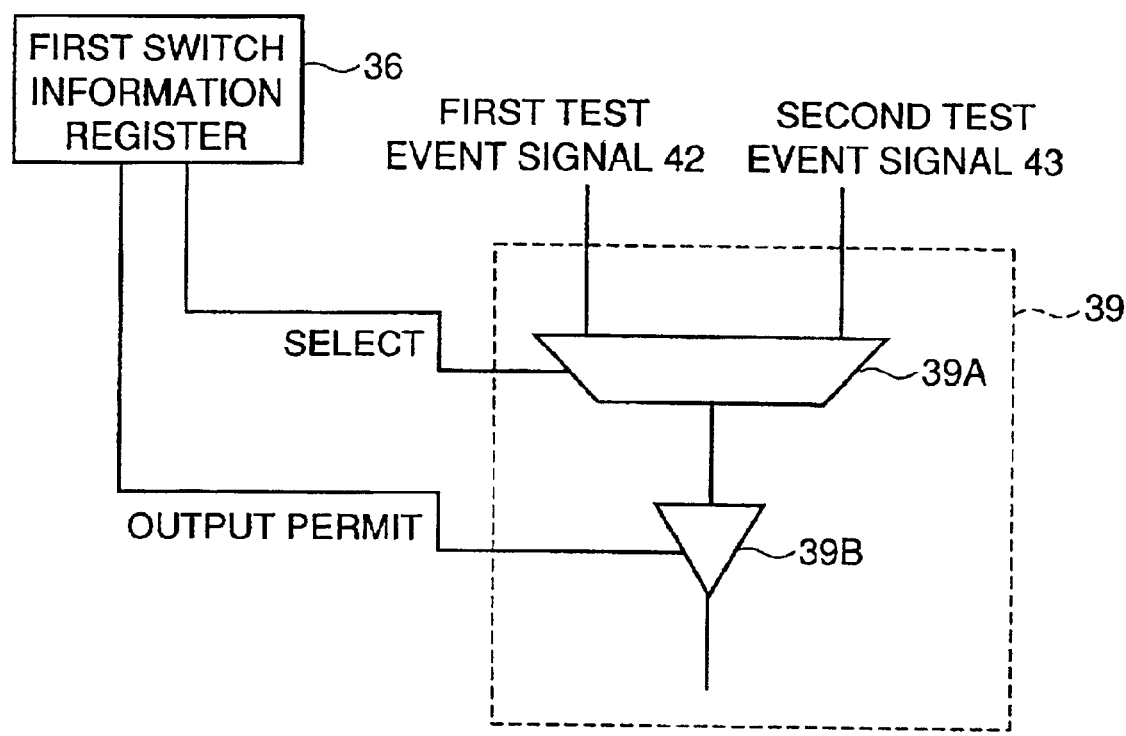
FIG. 12 is a block diagram showing an arrangement of the first switch.

Referring to FIG. 12, first switch 39 includes: a selector 39A receiving a control signal from first switch information register 36 for selecting and outputting one of first and second test event signals 42 and 43; and a tristate buffer 39B connected to first switch information register 36 and selector 39A and receiving an output permitting condition from first switch information register 36 for controlling an output of selector 39A to be or not to be output based on the output permitting condition.

Tristate buffer 39B brings its output into a high impedance state when the output of selector 39A is not output. Thus, tristate buffer 39B serves as a switch controlling the output of selector 39A to be or not to be output to a processor core.

Data held in first switch information register 36 includes 2 bits, where the first bit corresponds to the above mentioned control signal and the second bit corresponds to the above mentioned output permitting condition. When the output of tristate buffer 39B is not permitted, the output of tristate buffer 39B is brought into the high impedance state, so that the processor core can input a signal from external terminal 56.

Second and third switches 40 and 41 also have the hardware structures similar to that of first switch 39, and therefore detailed description thereof will not be repeated.

Now, the operations of first and second test circuits 52 and 53, switch circuit 35, and microprocessor 51 will be described.

Referring to FIG. 10, first test circuit 52 controls an output value of first test event signal 42 in accordance with PC value 2 of processor core 22, a value of PC setting register 5, and a value of output control register 32. The values of PC setting register 5 and output control register 32 are set by a program executed in processor core 22 via processor bus 3. An operator sets the PC value of the instruction to be executed when asserting first test event signal 42 in PC setting register 5. Comparator 6 compares PC value 2 of processor core 22 and the value of PC setting register 5 set by the operator for outputting the comparison result.

The operator can set detecting condition 8 and output polarity condition 9 in output control register 32. Detecting condition 8 and output polarity condition 9 have already been described in the first embodiment, and therefore detailed description thereof will not be repeated.

When detecting condition 8 is "level detect," detector 11 detects as an assert period a period in which the comparison result of comparator 6 is "match." When detecting condition 8 is "edge detect," detector 11 detects only one operation cycle of processor core 22 from the point at which the comparison result is changed from "mismatch" to "match" as an assert period.

Polarity converter 12 outputs the value set as output polarity condition 9 when detector 11 detects the assert period, and outputs a value opposite to the value set as output polarity condition 9 when detector 11 does not detect the assert period.

A relationship among the set value of output control register 32, the output from comparator 6, and test event signal 42 is similar to that when the value of output permitting condition 10 is "permit" as described in the first embodiment. The relationship will be described with reference to FIGS. 13 to 16.

Figure 13:
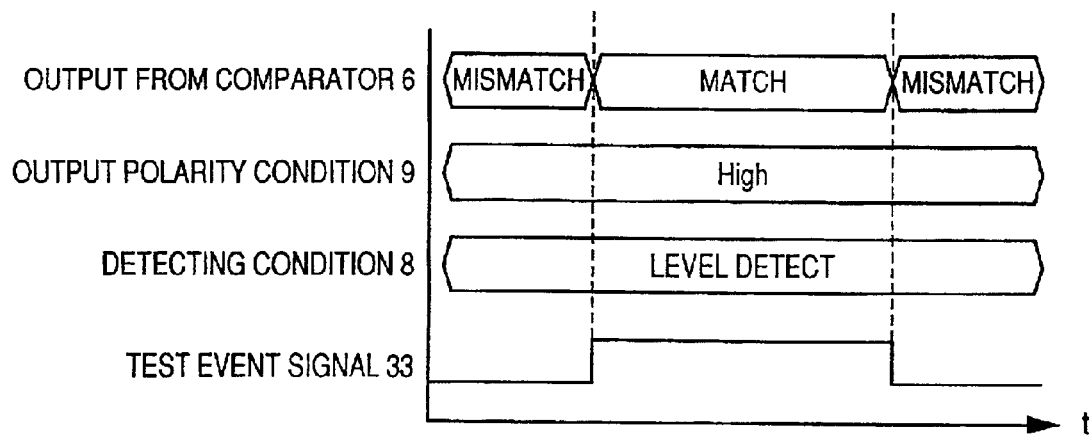
FIG. 13 is a diagram showing a waveform of a test event signal when an output polarity condition is "High," and detecting condition is "level detect."

Referring to FIG. 13, first test event signal 42 when output polarity condition 9 is "High" and detecting condition 8 is "level detect" will be described. The value of first test event signal 42 is "Low" and "High" respectively when the comparison result of comparator 6 is "mismatch" and "match."

Figure 14:
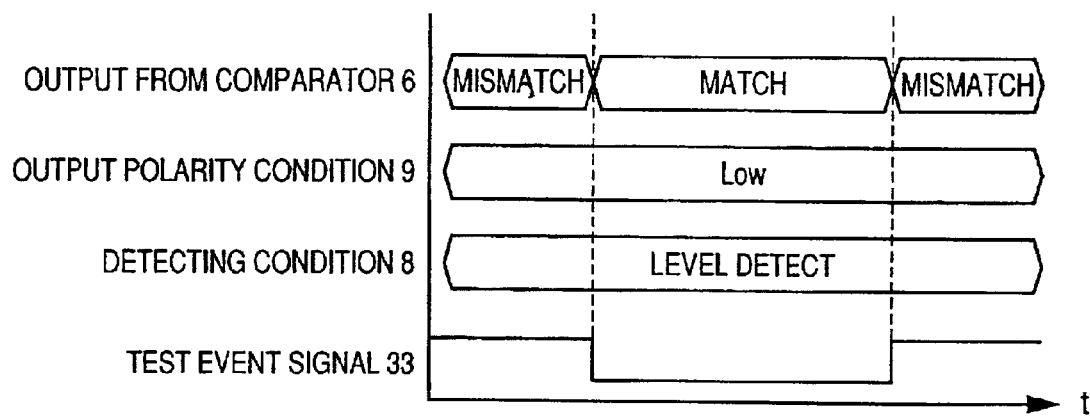
FIG. 14 is a diagram showing a waveform of a test event signal when the output polarity condition is "Low," and detecting condition is "level detect."

Referring to FIG. 14, first test event signal 42 when output polarity condition 9 is "Low" and detecting condition 8 is "level detect" will be described. The value of first test event signal 42 is "High" and "Low" respectively when the comparison result of comparator 6 is "mismatch" and "match." Thus, only the signal polarity is different from the case of FIG. 13.

Figure 15:
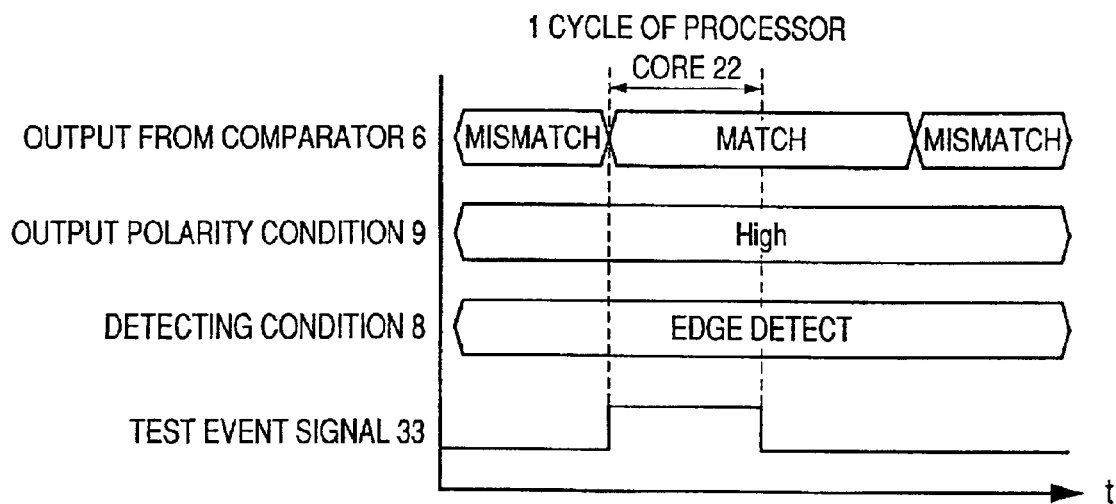
FIG. 15 is a diagram showing a waveform of the test event signal when the output polarity condition is "High," and detecting condition is "edge detect."

Referring to FIG. 15, first test event signal 42 when output polarity condition 9 is "High" and detecting condition 8 is "edge detect" will be described. The value of first test event signal 42 is "High" only for one operation cycle of processor core 22 when the comparison result of comparator 6 is changed from "mismatch" to "match." In all the other cases, value of test event signal 42 is "Low."

Figure 16:
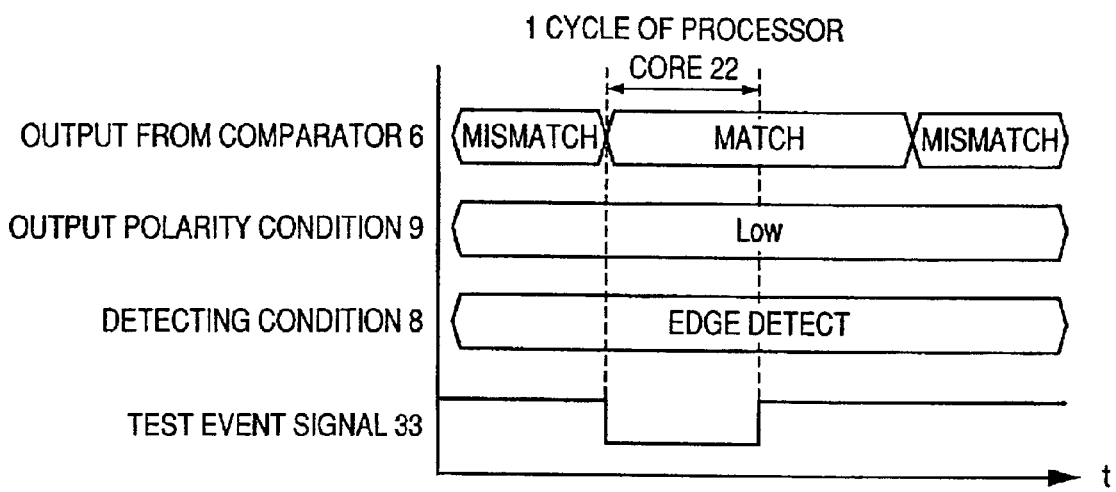
FIG. 16 is a diagram showing a waveform of the test event signal when the output polarity condition is "Low," and detecting condition is "edge detect."

Referring to FIG. 16, first test event signal 42 when output polarity condition 9 is "Low" and detecting condition 8 is "edge detect" will be described. The value of first test event signal 42 is "Low" only for one operation cycle of processor core 22 when the comparison result of comparator 6 is changed from "mismatch" to "match." In all the other cases, value of test event signal 42 is "High." Thus, only the signal polarity is different from the case of FIG. 15.

The operation of first test circuit 53 is similar to that of first test circuit 52, and therefore detailed description thereof will not be repeated.

Switch circuit 35 controls connection of first and second test event signals 42 and 43 in accordance with the values stored in first, second and third switch information registers 36, 37 and 38. At the time, neither first test event signal 42 nor second test event signal 43 may be supplied as an external event request signal. The values of first, second and third switch information registers 36, 37 and 38 are set by processor core 22 via processor bus 3. The operator sets connection permitting conditions of first and second test event signals 42 and 43 with respect to first to third switch information registers 36 to 38.

First switch 39 outputs the value of first test event signal 42 as first external event request signal 44 when the connecting permission of first test event signal 42 is set in first switch information register 36. First switch 39 outputs the value of second test event signal 43 as first external event request signal 44 when the connecting permission of second test event signal 43 is set. When connections of first and second test event signals 42 and 43 to processor core 22 are both prohibited, first external event request signal 44 is brought into the high impedance state.

As in the case of first switch 39, second switch 40 controls the value of second external event request signal 45 in accordance with the set value of second switch information register 37. Third switch 41 controls the value of third external event request signal 46 in accordance with the set value of third switch information register 38. First to third switches 39 to 41 may be simultaneously brought into the high impedance state.

Since connections of first and second test event signals 42 and 43 and switches 39 to 41 are controlled by a program, first to third external event request signals 44 to 46 are controlled.

Microprocessor 51 described in the second embodiment can use test event signals 42 and 43 as external event request signals 44 to 46. Test event signals 42 and 43 are generated in synchronization with PC value 2 of the instruction of processor core 22. Thus, the instruction to be executed in the assert period of external event request signal 44, 45 or 46 can readily be specified in a test program. In addition, even if the access time of processor core 22 with respect to memory 24 or external device is changed, or the instruction execution period is changed due to the change in pipeline control of processor core 22, a test can be performed without changing the test program.

In the present embodiment, connections of test event signals 42 and 43 to external event request signals 44 to 46 are controlled in accordance with the values of switch information registers 36 to 38 provided in switch circuit 35. Thus, as compared with the first embodiment, the connecting state is more dynamically changed. Even if the number of test circuits included in microprocessor 51 or the number of the external event request signals is changed, a similar effect can be produced by suitably changing the switch and switch information register of switch circuit 35.

Microprocessor 51 includes test event signal output terminals 54 and 55. Thus, test event signal 42 or 43 is applied as an external event request signal of the external device or another microprocessor, and test or debug of these devices can be performed in synchronization with an execution sequence of microprocessor 51. Test event signal output terminals 54 and 55 needs not be provided if such test or debug is not necessary.

Although microprocessor 51 is internally provided with switch circuit 35 in the above description, a similar effect can be produced by connecting switch circuit 35 to external bus 25, test event signal output terminals 54 and 55, and external event request signal input terminals 56 to 58. When such a hardware structure is employed, test event signal 42 or 43 can be used as an external event request signal of the external device or another microprocessor.

When an output control condition of test event signal 42 or 43 is fixed, a similar effect may be produced if one of detecting condition 8 and output polarity condition 9 included in output control register 32 is fixed. In such a case, information which can be fixed in output control register 32 is erased and one of detector 11 and polarity converter 12 corresponding to the information is removed to form test circuit 52 or 53.

In FIG. 11, three pieces of connecting information for controlling on/off of first to third switches 39 to 41 are held by three registers 36 to 38. However, the information may be retained in a single or two registers.

Further, in the present embodiment, contents of output control register 32 and first to third switch information registers 36 to 38 are set by a program. However, a similar effect can be produced if the contents are partially or entirely set via an external pin.

Third Embodiment

Figure 17:
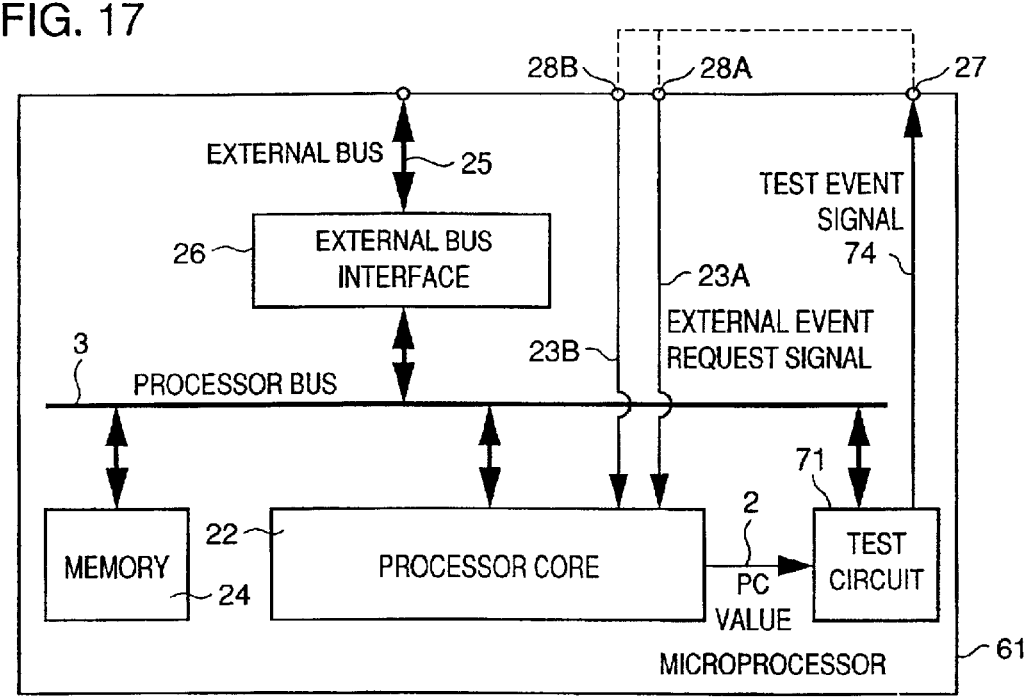
FIG. 17 is a diagram showing an arrangement of a hardware of a microprocessor according to the third embodiment of the present invention.

Referring to FIG. 17, a microprocessor 61 internally provided with a test circuit 71 according to the third embodiment of the present invention includes: a memory 24 storing a program and various data; a processor core 22 executing the program stored in memory 24; an external bus interface 26 serving as an interface portion with respect to an external bus 25 connected to an external device; and a test circuit 71 connected to processor core 22 and receiving a PC value 2 of an instruction of processor core 22 for outputting a test event signal 74 for testing microprocessor 61.

Microprocessor 61 further includes: a processor bus 3 for connecting processor core 22, memory 24, external bus interface 26 and test circuit 71; a test event signal output terminal 27 for outputting test event signal 74 to an external portion of microprocessor 61; and an external event request signal input terminal 28 provided for applying to processor core 22 an external event request signal 23 used by the external device to notify an event request with respect to processor core 22.

Figure 18:
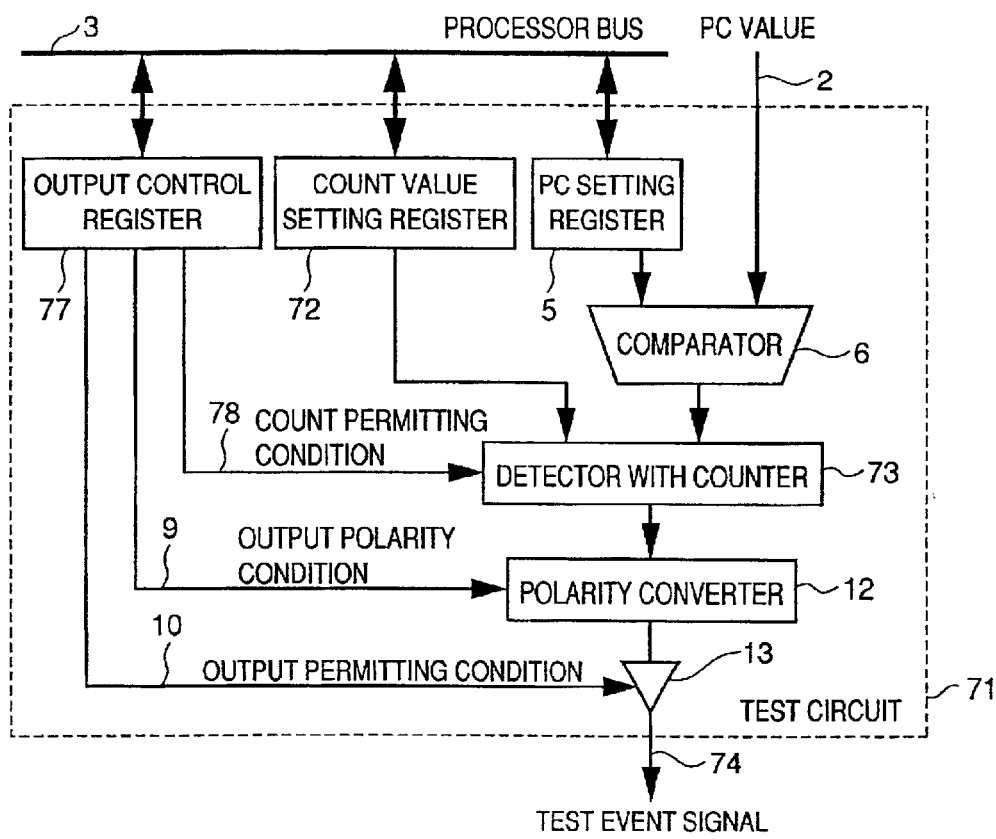
FIG. 18 is a diagram showing an arrangement of a hardware of a test circuit according to the third embodiment.

Referring to FIG. 18, test circuit 71 includes: a PC setting register 5 connected to processor bus 3 for storing a PC value asserting test event signal 74; an output control register 77 connected to processor bus 3 for storing an output condition of test event signal 74; a count value setting register 72 connected to processor bus 3 for holding a count value determining an assert timing of test event signal 74; and an comparator 6 connected to processor core 22 and PC setting register 5 for comparing PC value 2 and a value stored in PC setting register 5.

Test circuit 71 further includes: a detector with a counter 73 connected to comparator 6, output control register 77 and count value setting register 72 for detecting an assert period of test event signal 74 based on the comparison result of comparator 6, a count permitting condition 78 indicating if a count operation is permitted in the assert period of test event signal 74 stored in output control register 77, and a value of counter value setting register 72; a polarity converter 12 connected to detector with counter 73 and output control register 77 for determining an output polarity of test event signal 74 based on an output from detector with counter 73 and an output polarity condition 9 in the assert period of test event signal 74 stored in output control register 77; and a test event signal driver 13 connected to polarity converter 12 and output control register 77 for outputting test event signal 74 based on the output from polarity converter 12 and an output permitting condition 10 of test event signal 74 stored in output control register 77.

Figure 19:
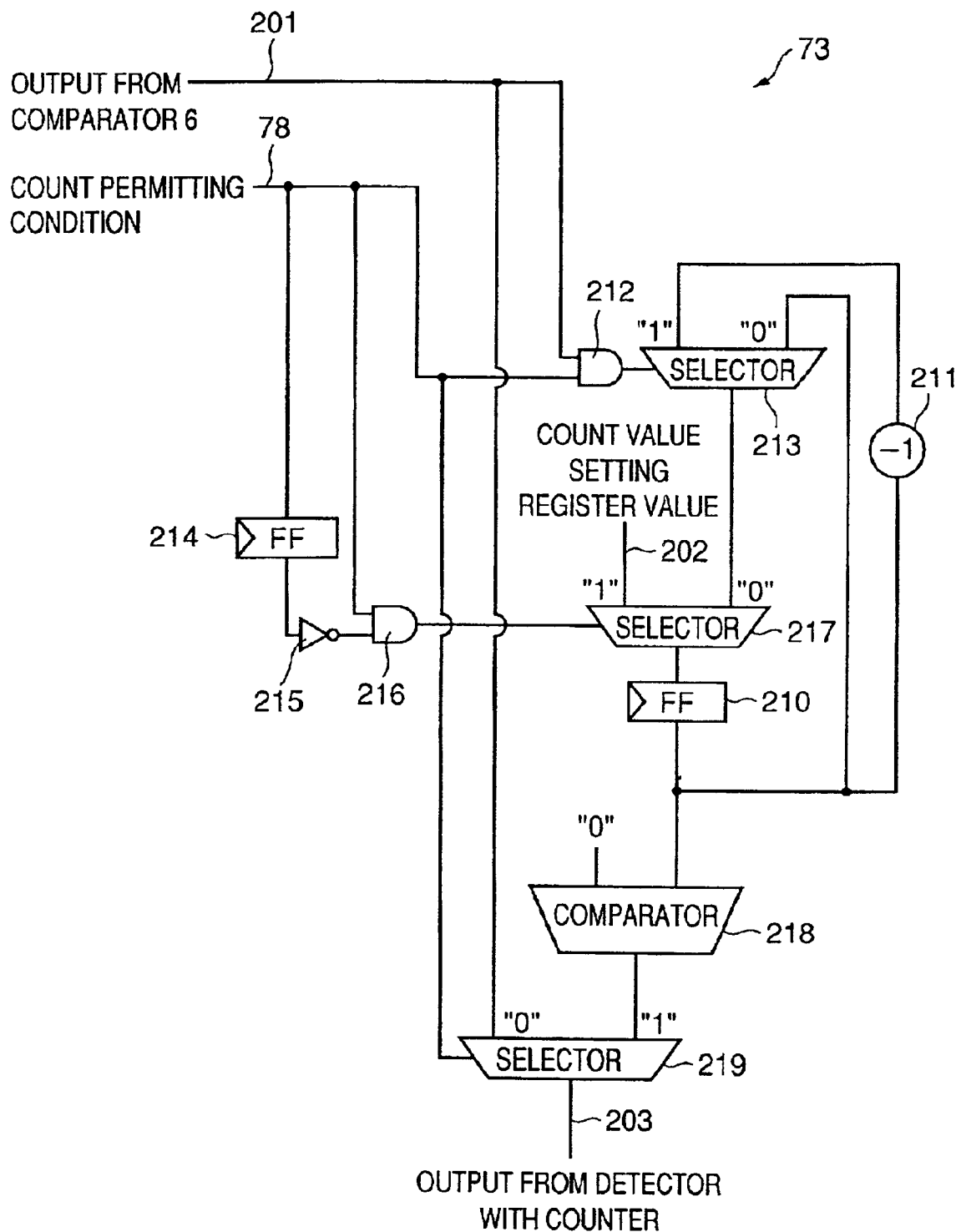
FIG. 19 is a block diagram showing an arrangement of a hardware of a detector with a counter 73 according to the third embodiment.

The hardware structure of detector with counter 73 will now be described with reference to FIG. 19. Here, assume that output 201 of comparator 6 indicates "1" and "0" respectively when the comparison result is "match" and "mismatch." A count permitting condition 78 stored in output control register 77 respectively indicate "1" and "0" when the count operation is "permitted" and "prohibited." Output signal 203 from detector with counter 73 indicates respectively "1" and "0" in the assert period and negate period of test event signal 74. A clock input of a flip flop (FF) circuit included in detector with counter 73 is the same as the operation clock of the processor core.

Detector with counter 73 includes: an FF circuit 214 connected to output control register 77 and delaying count permitting condition 78 by one clock cycle; an inverter 215 connected to an output of FF circuit 214; an AND circuit 216 connected to output control register 77 and inverter 215 and having as inputs count permitting condition 78 and an output from inverter 215; an AND circuit 212 connected to comparator 6 and output control register 77 and having as inputs output 201 from comparator 6 and count permitting condition 78; and a selector 213 connected to AND circuit 212, FF circuit 210 (later described) and subtracter 211 for selecting and outputting an output value of subtracter 211 and an output value of FF circuit 210 respectively when an output from AND circuit 212 is "1" and "0."

Detector with counter 73 further includes: a selector 217 connected to count value setting register 72, selector 213 and AND circuit 216 and selecting and outputting set value 202 of count value setting register 72 and an output value of selector 213 respectively when an output from AND circuit 216 is "1" and "0"; an FF circuit 210 connected to selector 217 and holding an output value of selector 217; a subtracter 211 connected to FF circuit 210 and subtracting "1" from an output value of FF circuit 210; a comparator 218 connected to FF circuit 210 for comparing an output from FF circuit 210 and "0" and outputting "1" when the output from FF circuit 210 is "0"; and a selector 219 connected to comparator 6, comparator 218 and output control register 77 and selecting an output from comparator 218 and output 201 of comparator 6 respectively when count permitting condition 78 is "1" and "0" for determining an output 203 of detector with counter 73.

Selector 213 performs a count operation by outputting a value which has been obtained by subtracting "1" from a count value when the comparison result from comparator 6 is "match" and counting is permitted.

AND circuit 216 outputs "1" only for one clock cycle of the operation of the processor core when count permitting condition 78 is changed from "0" to "1." Selector 217 outputs set value 202 of count value setting register 72 when count permitting condition 78 is changed from "prohibit" to "permit," but in all the other cases outputs an output from selector 213.

If FF circuit 210 holds data of at least 2 bits, comparator 218 can be implemented as an NAND circuit having all bits of FF circuit 210 as inputs. If FF circuit 210 retains data of 1 bit, it can be implemented as an inverter having the bit as an input.

Now, the operations of test circuit 71 and microprocessor 61 will be described.

Referring to FIG. 18, test circuit 71 controls an output value of test event signal 74 in accordance with PC value 2 of processor core 22, a value of PC setting register 5, a value of output control register 77, and a value of count value setting register 72. The values of PC setting register 5, output control register 77, and count value setting register 72 are set by a program executed in processor core 22 via processor bus 3. The operator sets a PC value of an instruction to be executed when test event signal 74 is asserted in PC setting register 5. Comparator 6 compares PC value 2 of processor core 22 and the value of PC setting register 5, which has been set by the operator, for outputting a comparison result.

The operator can set count permitting condition 78, output polarity condition 9, and output permitting condition 10 in output control register 77. Before detecting an assert period of test event signal 74, a condition permitting/prohibiting use of a counter of detector with counter 73 can be set as a count permitting condition 78. Since output polarity condition 9 and output permitting condition 10 are the same as in the first embodiment, description thereof will not be repeated.

Detector with counter 73 initializes a counter when count permitting condition 78 is changed from "prohibit" to "permit," and sets the value of count value setting register 72 as an initial value of the counter. Namely, it sets a set value 202 of count value setting register 72 in FF circuit 210 shown in FIG. 19.

Detector with counter 73 starts a count operation when the comparison result of comparator 6 is "match" and count permitting condition 78 is "permit." Detector with counter 73 detects only one operation cycle of processor core 22 as the assert period of test event signal 74 when an operation cycle of processor core 22 is elapsed by a value set in count value setting register 72. On the other hand, when the comparison result of comparator 6 is "match" and count permitting condition 78 is "prohibit," detector with counter 73 always detects a period when the comparison result of comparator 6 is "match" as the assert period of test event signal 74.

Polarity converter 12 outputs the value set as output polarity condition 9 when the assert period is detected by detector with counter 73, and outputs a value which is opposite to that set as output polarity condition 9 when the assert period is not detected. Test event signal driver 13 outputs an output value of polarity converter 12 as test event signal 74 when output permitting condition 10 is "permit."

A relationship among the above mentioned set value of output control register 77, the set value of counter value setting register 72, an output from comparator 6, and test event signal 74 is shown in FIGS. 20 to 25.

Figure 20:
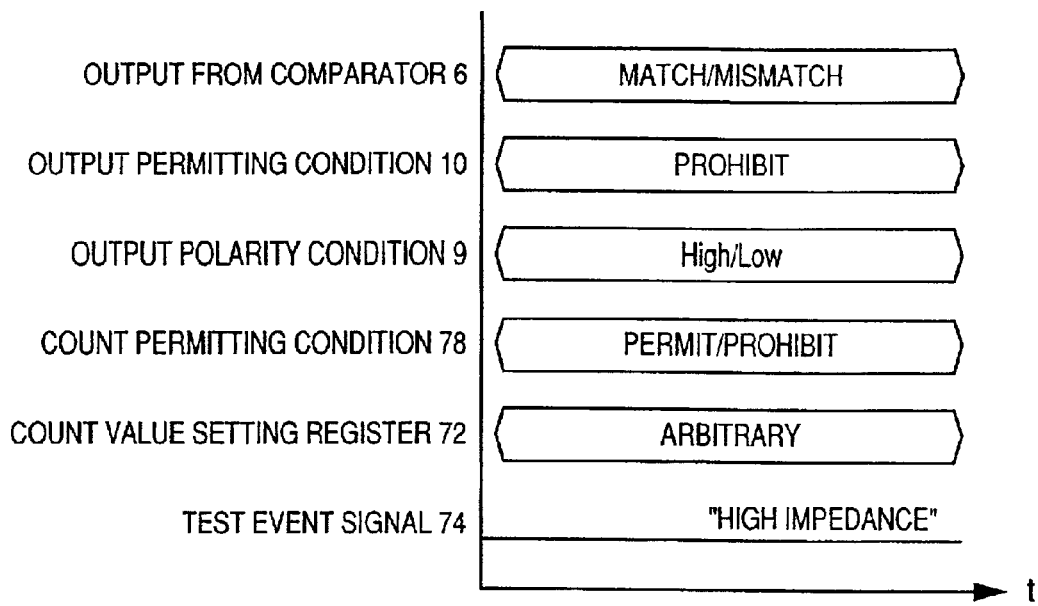
FIG. 20 is a diagram showing a waveform of a test event signal when an output permitting condition is "prohibit."

Referring to FIG. 20, when output permitting condition 10 is "prohibit," test event signal 74 is brought into a high impedance state regardless of the comparison result of comparator 6, output polarity condition 9, count permitting condition 78, or the value of counter value setting register 72.

When output permitting condition 10 is "permit," the operation of test event signal 4 is changed in accordance with the comparison result of comparator 6, output polarity condition 9, count permitting condition 78, or the value of counter value setting register 72.

Figure 21:
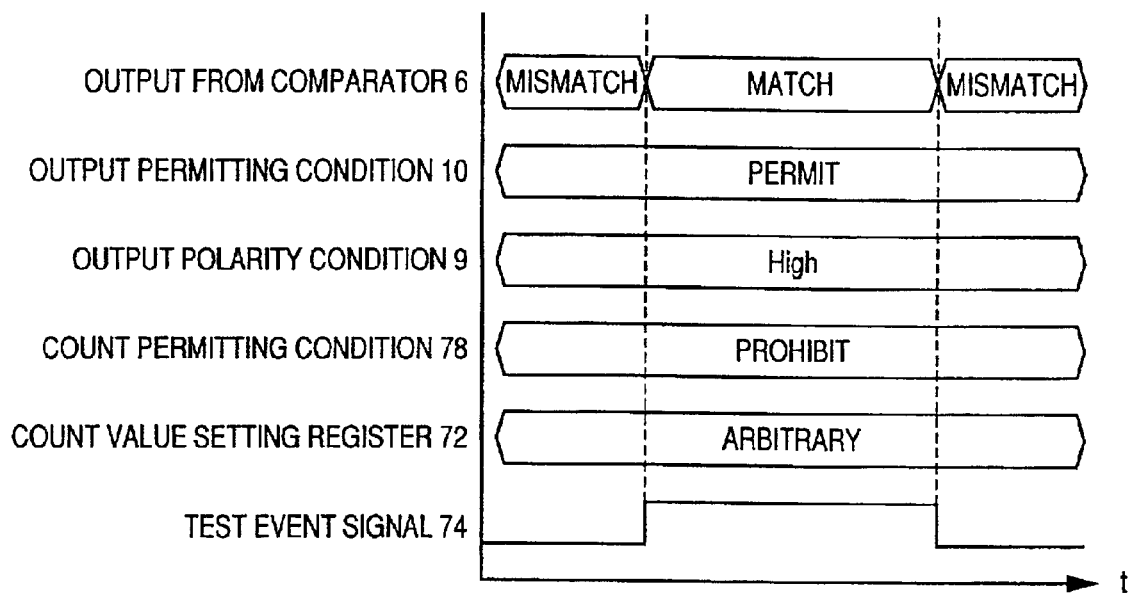
FIG. 21 is a diagram showing a waveform of the test event signal when the output permitting condition is "permit," output polarity condition is "High," and count permitting condition is "prohibit."

Referring to FIG. 21, test event signal 74 when output permitting condition 10 is "permit," output polarity condition 9 is "High," and count permitting condition 78 is "prohibit" will be described. The value of test event signal 74 is respectively "Low" and "High" when the comparison result is "mismatch" and "match" and does not depend on the value of counter value setting register 72.

Figure 22:
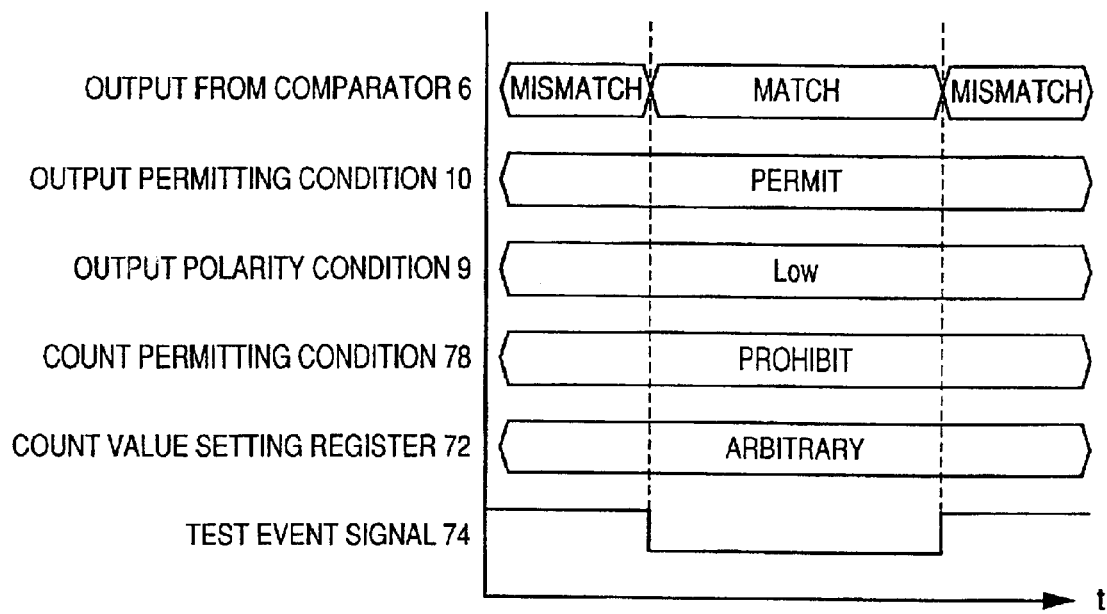
FIG. 22 is a diagram showing a waveform of the test event signal when the output permitting condition is "permit," output polarity condition is "Low," and count permitting condition is "prohibit."

Referring to FIG. 22, test event signal 74 when output permitting condition 10 is "permit," output polarity condition 9 is "Low" and count permitting condition 78 is "prohibit" will be described. The value of test event signal 74 is respectively "High" and "Low" when the comparison result is "mismatch" and "match" and does not depend on the value of counter value setting register 72. In addition, only the signal polarity is different from the case of FIG. 21.

Figure 23:
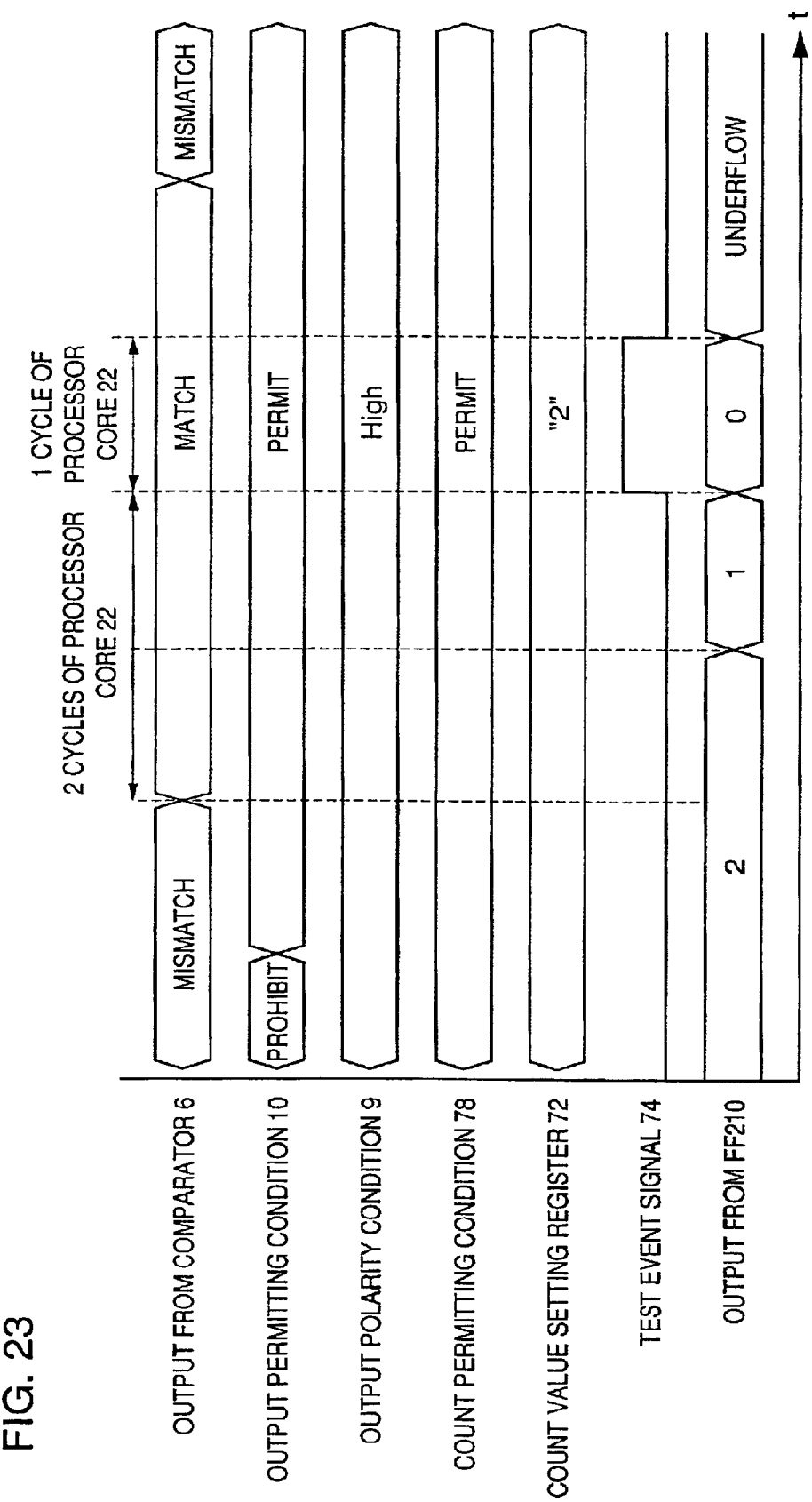
FIG. 23 is a diagram showing a waveform of the test event signal when the output permitting condition is "permit,"

Referring to FIG. 23, test event signal 74 when output permitting condition 10 is "permit," output polarity condition 9 is "High," count permitting condition 78 is "permit," and count value setting register 72 is "2" will be described. Test event signal 74 is "High" only for one cycle when two operation cycles of processor core 22 are elapsed after the comparison result becomes "match." In all the other cases, test event signal 74 is "Low." In addition, in the period in which the output from comparator 6 is "match," the output from FF circuit 210 is counted down one by one and test event signal 74 attains to "High" when the output from FF circuit 210 reaches "0."

Referring to FIG. 24, test event signal 74 when output permitting condition 10 is "permit," output polarity condition 9 is "Low," count permitting condition 78 is "permit," and count value setting register 72 is set at "2" will be described. Test event signal 74 attains to "Low" only for one cycle when the comparison result becomes "match" and two operation cycles of processor core 22 are elapsed after the comparison result becomes "match." In all the other cases, test event signal 74 is maintained is "High" and only the signal polarity is different from the case of FIG. 23. In the period in which the output from comparator 6 is "match," an output from FF circuit 210 is counted down one by one and test event signal 74 attains to "Low" when the output from FF circuit 210 attains to "0."

Referring to FIG. 25, test event signal 74 when output permitting condition 10 is "permit," output polarity condition 9 is "High," count permitting condition 78 is "permit," count value setting register 72 is set at "2," and when the comparison result is not "match" for successive three cycles will be described. The counter of detector with counter 73 is initialized only when count permitting condition 78 is changed from "prohibit" to "permit." In addition, the count operation is performed only when the comparison result is "match" and count permitting condition 78 is "permit." Accordingly, the count operation is performed in the first and second matching periods 65 and 66, but the count value is maintained in the mismatching period. Thus, test event signal 74 attains to "High" in a third matching period 67 when a matching period corresponding to two cycles is elapsed. Further, the output of FF circuit 210 is counted down one by one in a period in which the output from comparator 6 is "match," and test event signal 74 attains to "High" when the output from FF circuit 210 attains to "0".

Test event signal 74 performing the above described operation is output to an external portion of microprocessor 61 through test event signal output terminal 27. In the external portion of microprocessor 61, test event signal output terminal 27 and an arbitrary external event request signal input terminal 28 are connected and arbitrary external event request signal 23 is applied to processor core 22. The program tests microprocessor 21 in accordance with external event request signal 23.

Microprocessor 61 of the third embodiment can use test event signal 74 as external event request signal 23. Test event signal 74 is generated in synchronization with PC value 2 of an instruction of processor core 22. Thus, the instruction to be executed in the assert period of external event request signal 23 can readily be specified in the test program. Further, even if the access time of processor core 22 with respect to memory 24 or external device is changed, or the instruction execution period is changed due to the change in pipeline control of processor core 22, a test can be performed without changing the test program.

Test event signal 74 can be asserted for any part of the period in which the set value of PC setting register 5 and PC value 2 of processor core 22 match. Thus, a more flexible test is enabled as compared with the case of the first and second embodiments. In addition, as shown in FIG. 25, the assert cycle can be controlled even when the matching periods are not successive. Thus, when a loop process is performed by processor core 22, the matching period of comparator 6 in a prescribed loop can be designated as the assert cycle. Note that if the execution time of the instruction having PC value 2, which is the same as that of PC setting register 5 after count permitting condition 78, is changed from "prohibit" to "permit," the test program before the change cannot be used again.

By connecting test event signal output terminal 27 to a plurality of external event request signal input terminals 28 at the same time, the plurality of external event request signals 23 can be applied to processor core 22 under the same condition. In addition, a plurality of test circuits 71 are provided in microprocessor 61 and a plurality of test event signal output terminals 27 for externally outputting outputs from a plurality of test circuits 71 can be provided. By connecting the plurality of test event signal output terminals 27 to desired external event request signal input terminals 28, respectively, a plurality of external event request signals 23 generated under different conditions can be applied to processor core 22.

Test event signal output terminals 27 are not necessarily connected to external event request signal input terminals 28 of microprocessor 61. By connecting them to the external device or another microprocessor, test event signals 74 can be applied as the external event request signals to these devices. Thus, test or debug of the external device or another microprocessor can be performed in synchronization with an execution sequence of microprocessor 61.

In the above description, test event signal output terminal 27 and external event request signal input terminal 28 are connected to use test event signal 74 of microprocessor 61 as external event request signal 23. However, if it is preliminary known that test event signal 74 is used as external event request signal 23, test circuit 71 and processor core 22 may be connected in microprocessor 61. Test event signal 74 (external event request signal 23) is directly applied to processor core 22 by test circuit 71. Then, test event signal output terminal 27 needs not be provided.

When the output control condition of test event signal 74 is fixed, a similar effect can be produced by fixing one of count permitting condition 78, output polarity condition 9, and output permitting condition 10 in output control register 77. In such a case, information which can be fixed in output control register 77 is erased and one of detector with counter 73, polarity converter 12, and test event signal driver 13 corresponding to that information is removed to form test circuit 71.

Further, in the third embodiment, the values of output control register 77 and count value setting register 72 are set by a program. However, the values may be partially or entirely set through the external pin to produce a similar effect.

If test circuit 1 of microprocessor 21 of the first embodiment is replaced by test circuit 71 of the third embodiment, a hardware structure similar to that of microprocessor 61 of the third embodiment is obtained. Similarly, if test circuits 52 and 53 of microprocessor 51 of the second embodiment is replaced by a test circuit obtained by removing output permitting condition 10 and test event signal driver 13 from test circuit 71 of the third embodiment, an arrangement similar to that of microprocessor 51 of the second embodiment is obtained.

Fourth Embodiment

Referring to FIG. 26, a microprocessor 81 internally provided with a test circuit 91 according to the fourth embodiment of the present invention includes: a memory 24 storing a program and various data; a processor core 22 for executing a program stored in memory 24; an external bus interface 26 serving as an interface portion with respect to an external bus 25 connected to an external device; and a test circuit 91 connected to processor core 22 and external bus interface 26 and receiving a PC value 2 of an instruction of processor core 22 and wait count value 92 indicating a period before data access is permitted over external bus 25 for outputting a test event signal 94 for testing microprocessor 81.

Microprocessor 81 further includes: a processor bus 3 for interconnecting processor core 22, memory 24, external bus interface 26, and test circuit 91; a test event signal output terminal 27 for outputting test event signal 94 to an external portion of microprocessor 81; and an external event request signal input terminal 28 provided for applying to processor core 22 external event request signal 23 used by the external device to notify an event request with respect to processor core 22.

Referring to FIG. 27, test circuit 91 includes: a PC setting register 5 connected to processor bus 3 and storing a PC value asserting test event signal 74; an output control register 97 connected to processor bus 3 and storing an output condition of test event signal 94; and a comparator 6 connected to processor core 22 and PC setting register 5 for comparing PC value 2 and the value stored in PC setting register 5.

Test circuit 91 further includes: a detector 93 connected to comparator 6, output control register 97 and external bus interface 26 for detecting an assert period of test event signal 94 based on the comparison result of comparator 6, wait reference permitting condition 98 stored in output control register 97, and wait count value 92 output from external bus interface 26; a polarity converter 12 connected to detector 93 and output control register 97 for determining an output polarity of test event signal 94 based on an output from detector 93 and an output polarity condition 9 when test event signal 94 stored in output control register 97 is asserted; and a test event signal driver 13 connected to polarity converter 12 and output control register 97 for outputting test event signal 94 based on an output from polarity converter 12 and output permitting condition 10 of test event signal 94 stored in output control register 97.

Referring to FIG. 28, a hardware structure of detector 93 will be described. Here, an output 201 from comparator 6 is "1" and "0" respectively when the comparison result is "match" and "mismatch." Wait reference permitting condition 98 stored in output control register 97 indicates "1" and "0" respectively when reference to the wait count value is permitted and prohibited in generating the test event signal. Wait count value 92 indicates "0" only in a period in which bus access over external bus 25 is permitted.

Detector 93 includes: a comparator 221 outputting "1" and "0" respectively when wait count value 92 is "0" and "1"; and a selector 222 connected to comparator 221, comparator 6 and output control register 97 for outputting a value of comparator 221 and output 201 from comparator 6 respectively when a value of wait reference permitting condition 98 is "1" and "0." Output signal 220 from detector 93 indicates "1" and "0" respectively in an assert period and a negate period of test event signal 94.

Comparator 221 can be implemented as an NAND circuit having as inputs all bits when wait count value 92 has at least two bits. When wait count value 92 has 1 bit, comparator 221 can be implemented as an inverter.

Now, the operations of test circuit 91 and microprocessor 81 will be described.

Referring to FIG. 27, test circuit 91 controls an output value of test event signal 94 in accordance with PC value 2 of processor core 22, a value of PC setting register 5, a value of output control register 97, and a wait count value 92. The values of PC setting register 5 and output control register 97 are set by a program executed by processor core 22 via processor bus 3. An operator sets a PC value of the instruction to be executed when test event signal 94 is asserted in PC setting register 5. Comparator 6 compares PC value 2 of processor core 22 and the value of PC setting register 5 set by the operator for outputting the comparison result.

The operator sets wait reference permitting condition 98, output polarity condition 9, and output permitting condition 10 in output control register 97. The operator can determine if reference to wait count value 92 is "permitted" or "prohibited" in detecting an assert period of test event signal 94 as wait reference permitting condition 98. Output polarity condition 9 and output permitting condition 10 are the same as in the case of the first embodiment, and therefore detailed description thereof will not be repeated.

Detector 93 detects as the assert period of test event signal 94 the period in which the comparison result is 1 and wait count value 92 indicates valid data access period when wait reference permitting condition 98 is "permit." On the other hand, when wait reference permitting condition 98 is "prohibit," it always detects as the assert period the period in which the comparison result is "match."

Polarity converter 12 outputs a value set as output polarity condition 9 and a value opposite to that set as output polarity condition 9 respectively when detector 93 does and does not detect the assert period.

Test event signal driver 13 outputs as test event signal 94 an output value of polarity converter 12 when output permitting condition 10 is "permit."

A relationship among the above described set value of output control register 97, wait count value 92, an output from comparator 6, and test event signal 94 are shown in FIGS. 29 to 33.

A signal value of wait count value 92 is hereinafter indicated as "access" or "wait." "Access" represents wait count value 92 when bus access over external bus 25 is started and data access is permitted. "Wait" represents wait count value 92 when the bus access over external bus 25 is started and data access is not permitted.

Referring to FIG. 29, when output permitting condition 10 is "prohibit," test event signal 94 is brought into a high impedance state regardless of the comparison result of comparator 6, wait reference permitting condition 98, output polarity condition 9, and wait count value 92.

When output permitting condition 10 is "permit," the operation of test event signal 94 differs according to the comparison result of comparator 6, output polarity 9, wait reference permitting condition 98, and the value of wait count value 92.

Referring to FIG. 30, test event signal 94 when output permitting condition 10 is "permit," output polarity condition 9 is "High" and wait reference permitting condition 98 is "prohibit" will be described. The value of test event signal 94 is "Low" and "High" respectively when the comparison result is "mismatch" and "match," and does not depend on wait count value 92.

Referring to FIG. 31, test event signal 94 when output permitting condition 10 is "permit," output polarity condition 9 is "Low" and wait reference permitting condition 98 is "prohibit" will be described. The value of test event signal 94 is "High" and "Low" respectively when the comparison result is "mismatch" and "match," and does not depend on the value of wait count value 92. In addition, only the signal polarity is different from the case of FIG. 30.

Referring to FIG. 32, test event signal 94 when output permitting condition 10 is "permit," output polarity condition 9 is "High," and wait reference permitting condition 98 is "permit" will be described. Test event signal 94 attains to "High" only when the comparison result is "match" and wait count value 92 is "access." In all the other cases, test event signal 94 is "Low."

Referring to FIG. 33, test event signal 94 when output permitting condition 10 is "permit," output polarity condition 9 is "Low" and wait reference permitting condition 98 is "permit" will be described. Test event signal 94 attains to "Low" only when the comparison result is "match" and wait count value 92 is "access." In all the other cases, test event signal 94 attains to "High," and only the signal polarity is different from the case of FIG. 32.

The above described test event signal 94 is output to an external portion of microprocessor 81 through test event signal output terminal 27. In the external portion of microprocessor 81, test event signal output terminal 27 and an arbitrary external event request signal input terminal 28 are connected, so that an arbitrary external event request signal 23 is applied to processor core 22. Microprocessor 81 is tested by the program in accordance with external event request signal 23.

Microprocessor 81 of the fourth embodiment can use test event signal 94 as external event request signal 23. Test event signal 94 is generated in synchronization with a PC value 2 of an instruction of processor core 22. Thus, the instruction to be executed in an assert period of external event request signal 23 can readily be specified by the test program. In addition, even when the access time of processor core 22 with respect to memory 24 or an external device is changed or pipeline control of processor core 22 is changed, a test can be performed without changing the test program.

Test event signal 94 may also be asserted only when the value set in PC setting register 5 and PC value 2 of processor core 22 match and when wait count value 92 is "access." Thus, test event signal 94 can be asserted only when data access is permitted over external bus 25. Since control is performed in accordance with wait count value 92, even if the access time of processor core 22 with respect to the external device is changed, test event signal 94 can be asserted only when data access is permitted after the change in access time by using a test program before the change of the access time.

By connecting test event signal output terminal 27 to a plurality of external event request signal input terminals 28 at the same time, a plurality of external event request signals 23 can be generated under the same condition. In addition, when a plurality of test circuits 91 are provided in microprocessor 81, a plurality of test event signal output terminals 27 are arranged, and the plurality of test event signal output terminals 27 are connected to desired external event request signal input terminals 28, respectively, a plurality of external event request signals 23 can be applied to processor core 22 under different conditions.

Test event signal output terminal 27 is not necessarily connected to external event request signal input terminal 28 of microprocessor 81. By connecting test event signal output terminal 27 to an external device or another microprocessor, test event signal 94 can be applied as an external event request signal to these devices. Thus, test or debug of their external device or another microprocessor can be performed in synchronization with an execution sequence of microprocessor 81.

In the above description, test event signal output terminal 27 and external event request signal input terminal 28 are connected to use test event signal 94 of microprocessor 81 as external event request signal 23. However, when it is preliminary known that test event signal 94 is to be used as external event request signal 23, test circuit 91 and processor core 22 may be connected in microprocessor 81, so that test event signal 94 (external event request signal 23) is directly applied to processor core 22 from test circuit 91. Then, test event signal output terminal 27 needs not be provided.

When an output control condition of test event signal 94 is fixed, in some cases, one of wait reference permitting condition 98, output polarity condition 9 and output permitting condition 10 included in output control register 97 is fixed to produce a similar effect. In such a case, fixable information in output control register 97 is erased, and one of detector 93, polarity converter 12 and test event signal driver 13 corresponding to that information is removed to form a test circuit 91.

Although the value of output control register 97 is set by a program in the fourth embodiment, the value may be partially or entirely set through an external pin to produce a similar effect. Processor 81 may receive a ready signal indicating a cycle during which bus access over external bus 25 is permitted, a data complete signal or the like through an external terminal (not shown) rather than to notify an access state of external bus 25 using wait count value 92. Processor 81 receives these signals to output data to external bus 25 or read data from bus 25. Thus, detector 93 of test circuit 91 may detect the assert period of the test event signal in accordance with a signal indicating a cycle during which data of external bus 25 is valid instead of wait count value 92 to produce a similar effect.

When there is a signal indicating the access state of processor bus 3, the signal is used in place of wait count value 92 to enable control of test event signal 94 depending on the state of processor bus 3.

Detector 93 of the fourth embodiment detects as an assert period of test event signal 94 a period in which PC value 2 and the set value of PC setting register 5 match and external bus 25 is in a data valid cycle. Alternatively, detector 93 may detect the assert period when wait count value 92 is "wait."

If test circuit 1 of microprocessor 21 of the first embodiment is replaced by test circuit 91 of the fourth embodiment, a hardware structure similar to that of microprocessor 81 of the fourth embodiment is obtained. Similarly, if test circuits 52 and 53 of the microprocessor of the second embodiment are replaced by the test circuit obtained by removing output permitting condition 10 and test event signal driver 13 from test circuit 91 of the fourth embodiment, a microprocessor having a hardware structure similar to that of the second embodiment is obtained.

According to the present invention, the test circuit and the processor core operate in synchronization with the same clock signal, and the test event signal generated by the test circuit is applied to the processor core. Thus, the instruction to be executed in the assert period of the test event signal can readily be specified in the program. In addition, even if the access time of the processor core with respect to the memory or the external device is changed, or the instruction execution time is changed due to the change in pipeline control of the processor core, a test can be performed without changing the program.

The test event signal is generated based on the output condition. Thus, the test event signal can be generated according to the purpose of a test.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A microprocessor, comprising:
   a processor core for executing a program and outputting a program counter value of an instruction included in said program; and
   a test circuit configured for outputting a test event signal in accordance with said program counter value, said test circuit including
   a program counter setting register for holding a set program counter value,
   an output control register for holding an output condition of said test event signal,
   a comparator connected to said processor core and said program counter setting register for comparing said program counter value output from said processor core and said program counter value set in said program counter setting register, and transmitting a comparison result signal, and
   a test event signal generating portion arranged to be connected to said comparator and said output control register and configured for receiving said comparison result signal from said comparator and said output condition from said output control register, and generating said test event signal based on the comparison result of said comparator and said output condition.

2. The microprocessor according to claim 1, wherein said output condition includes an output permitting condition indicating as to if said test event signal is output, and
   said test event signal generating portion is arranged to include a test event signal driver configured for controlling passing, blocking of the comparison result of said comparator based on said output permitting condition.

3. The microprocessor according to claim 1, further comprising a test event signal output terminal arranged to be connected to said test circuit and configured for outputting said test event signal to an external portion.

4. A microprocessor, comprising:
   a processor core for executing a program and outputting a program counter value of an instruction included in said program; and
   a test circuit configured for outputting a test event signal in accordance with said program counter value, said test circuit including
   a program counter setting register for holding a set program counter value,
   an output control register for holding an output condition of said test event signal,
   a comparator connected to said processor core and said program counter setting register for comparing said program counter value output from said processor core and said program counter value set in said program counter setting register, and
   a test event signal generating portion arranged to be connected to said comparator and said output control register and configured for generating said test event signal based on the comparison result of said comparator and said output condition, wherein
   said output condition includes a detecting condition indicating one of level detection where a period during which the comparison result of said comparator indicates a prescribed value is determined as an assert period of said test event signal and edge detection where a first prescribed clock cycle of a period during which the comparison result of said comparator indicates a prescribed value is determined as the assert period of said test event signal, and
   said test event signal generating portion is arranged to include a detector for detecting the assert period of said test event signal based on the comparison result of said comparator and said detecting condition.

5. The microprocessor according to claim 4, wherein said output condition further includes an output polarity condition indicating a polarity of the assert period of said test event signal, and said test event signal generating portion is arranged to further include a polarity converter arranged to be connected to said detector and said output control register, said polarity converter configured for generating as said test event signal a signal of which the assert period has a polarity designated by said output polarity condition based on an output from said detector and said output polarity condition.

6. The microprocessor according to claim 5, wherein said output condition further includes an output permitting condition indicating as to if said test event signal is output, and said test event signal generating portion is arranged to further include a test event signal driver connected to said polarity converter and said output control register, said test event signal driver configured for controlling passing/blocking of an output from said polarity converter based on said output permitting condition.

7. A microprocessor, comprising:

a processor core for executing a program and outputting a program counter value of an instruction included in said program; and a test circuit configured for outputting a test event signal in accordance with said program counter value, said test circuit including a program counter setting register for holding a set program counter value, an output control register for holding an output condition of said test event signal, a comparator connected to said processor core and said program counter setting register for comparing said program counter value output from said processor core and said program counter value set in said program counter setting register, and a test event signal generating portion arranged to be connected to said comparator and said output control register and configured for generating said test event signal based on the comparison result of said comparator and said output condition, wherein said output condition includes an output polarity condition indicating a polarity of an assert period of said test event signal, and said test event signal generating portion is arranged to include a polarity converter configured for generating as said test event signal a signal of which assert period has a polarity designated by said output polarity condition based on the comparison result of said comparator and said output polarity condition.

8. A microprocessor, comprising:

a processor core for executing a program and outputting a program counter value of an instruction included in said program; and a test circuit configured for outputting a test event signal in accordance with said program counter value, said test circuit including a program counter setting resister for holding a set program counter value, an output control register for holding an output condition of said test event signal, a comparator connected to said processor core and said program counter setting register for comparing said program counter value output from said processor core and said program counter value set in said program counter setting register, and a test event signal generating portion arranged to be connected to said comparator and said output control register and configured for generating said test event signal based on the comparison result of said comparator and said output condition, the microprocessor further including a plurality of said test circuits, and a switch circuit arranged to be connected to said plurality of test circuits and said processor core, and configured for switching among a plurality of test event signals output from said plurality of test circuits for outputting it to said processor core based on preliminary set connecting information.

9. The microprocessor according to claim 8, wherein said switch circuit is arranged to include a plurality of switch information registers respectively for holding a plurality of connecting information, and a plurality of switches respectively arranged to be connected to said plurality of switch information registers and each connected to said plurality of test circuits for switching among a plurality of test event signals output from said plurality of test circuits for output based on the connecting information in the switch information register connected to said each switch.

10. A microprocessor, comprising:

a processor core for executing a program and outputting a program counter value of an instruction included in said program; and a test circuit configured for outputting a test event signal in accordance with said program counter value, said test circuit including a program counter setting register for holding a set program counter value, an output control register for holding an output condition of said test event signal, a comparator connected to said processor core and said program counter setting register for comparing said program counter value output from said processor core and said program counter value set in said program counter setting register, and a test event signal generating portion arranged to be connected to said comparator and said output control register and configured for generating said test event signal based on the comparison result of said comparator and said output condition, wherein said output condition includes a count permitting condition indicating as to if a count operation is permitted in an assert period of said test event signal, said test circuit is arranged to further include a count value setting register for holding a set count value, and said test event signal generating portion is arranged to include a detector connected to said comparator, said output control register, and said count value setting register for counting a period during which the comparison result of said comparator is a prescribed value based on said count value held in said count value setting register when said count operation is permitted based on said count permitting condition and detecting said test event signal based on the counted result.

11. A microprocessor, comprising:

a processor core for executing a program and outputting a program counter value of an instruction included in said program; and a test circuit configured for outputting a test event signal in accordance with said program counter value, said test circuit including a program counter setting register for holding a set program counter value, an output control register for holding an output condition of said test event signal, a comparator connected to said processor core and said program counter setting register for comparing said program counter value output from said processor core and said program counter value set in said program counter setting register, and a test event signal generating portion arranged to be connected to said comparator and said output control register and configured for generating said test event signal based on the comparison result of said comparator and said output condition, the microprocessor further comprising an external bus interface configured for outputting a wait count value representing a period before bus access over an external bus is permitted and connecting said microprocessor to an external portion, wherein said output condition includes a wait reference permitting condition indicating as to if reference to said wait count value is permitted in generating said test event signal, and said test event signal generating portion is arranged to include a detector connected to said comparator, said output control register, and said external bus interface for detecting an assert period of said test event signal when reference to said wait count value is permitted based on said wait reference permitting condition and when said wait count value output from said external bus interface is a prescribed value.

12. The microprocessor according to claim 11, wherein said detector includes a wait count value comparator for comparing said wait count value and said prescribed value, and a selector configured to have as inputs outputs of said comparator and said wait count value comparator for directing one of said inputs to an output based on said wait reference permitting condition.

13. A microprocessor, comprising:

a processor core for executing a program and outputting a program counter value of an instruction included in said program; and a test circuit configured for outputting a test event signal in accordance with said program counter value, said test circuit including a program counter setting register for holding a set program counter value, an output control register for holding an output condition of said test event signal, a comparator connected to said processor core and said program counter setting register for comparing said program counter value output from said processor core and said program counter value set in said program counter setting register, and a test event signal generating portion arranged to be connected to said comparator and said output control register and configured for generating said test event signal based on the comparison result of said comparator and said output condition, the microprocessor further comprising an external bus interface configured for receiving a ready signal indicating that bus access over an external bus is permitted for connecting said microprocessor to an external portion, wherein said output condition includes a ready signal reference permitting condition indicating as to if reference to said ready signal is permitted in generating said test event signal, and said test event signal generating portion is arranged to include a detector connected to said comparator, said output control register, and said external bus interface for detecting an assert period of said test event signal in accordance with said ready signal when reference to said ready signal is permitting based on said ready signal reference permitting condition.

14. A microprocessor, comprising:

a processor core for executing a program and outputting a program counter value of an instruction included in said program; and a test circuit configured for outputting a test event signal in accordance with said program counter value, said test circuit including a program counter setting register for holding a set program counter value, an output control register for holding an output condition of said test event signal, a comparator connected to said processor core and said program counter setting register for comparing said program counter value output from said processor core and said program counter value set in said program counter setting register, and a test event signal generating portion arranged to be connected to said comparator and said output control register and configured for generating said test event signal based on the comparison result of said comparator and said output condition, the microprocessor further comprising a plurality of event request signal terminals respectively configured for receiving a plurality of event request signals, a plurality of interconnections arranged for connecting said processor core to said plurality of event request signal terminals, and a switch circuit configured for receiving said test event signal output from said test circuit for determining if said test event signal is to be supplied to each of said plurality of interconnections.

15. The microprocessor according to claim 14, wherein said switch circuit is arranged to include a plurality of switches arranged to be connected to said plurality of interconnections and configured for determining if said test event signal is to be output to said each of the connected interconnections, and at least one switch information register connected to said plurality of switches for holding information for controlling on/off of each of said plurality of switches.

16. The microprocessor according to claim 15, wherein said switch information register can hold information allowing said plurality of switches to be turned off at the same time.

17. A microprocessor, comprising:

a processor core for executing a program, outputting a program counter value of an instruction included in said program, and receiving a plurality of event request signals for executing a prescribed instruction in response to each of said event request signals;

a test circuit configured for generating and outputting a test event signal in accordance with said program counter value;

a plurality of external terminals each configured for receiving an external signal;

a plurality of interconnections respectively arranged to be connected to said plurality of external terminals and each configured for transferring said external signal received from said connected external terminal as said event request signal; and a switch circuit configured for receiving said test event signal output from said test circuit for determining if said test event signal is to be supplied to each of said plurality of interconnections as said event request signal.

18. The microprocessor according to claim 17, wherein said switch circuit is arranged to include a plurality of switches respectively arranged to be connected to said plurality of interconnections and each configured for determining if said test event signal is to be output to said connected interconnections and at least one switch information register connected to said plurality of switches for holding information for controlling on/off of each of said plurality of switches.

19. The microprocessor according to claim 17, further comprising another test circuit configured for generating and outputting another test event signal in accordance with said program counter value, wherein said switch circuit is arranged to include a plurality of selectors each for selecting one of test event signal output from said test circuit and another test event signal output from said another test circuit, and a plurality of switches respectively arranged to be connected to said plurality of selectors and said plurality of interconnections and each configured for determining if said signal output from said selector is to be output to each of said interconnections.

20. The microprocessor according to claim 19, wherein said switch circuit is arranged to further include at least one switch control register for holding information for controlling selection of each of said plurality of selectors and holding information for controlling on/off of each of said plurality of switches.

* * * * *